US012554124B2

(12) United States Patent
Matsumaru et al.

(10) Patent No.: US 12,554,124 B2
(45) Date of Patent: Feb. 17, 2026

(54) OPTICAL DEFLECTOR DRIVING SYSTEM AND OPTICAL DEFLECTOR DRIVING METHOD

(71) Applicant: STANLEY ELECTRIC CO., LTD., Tokyo (JP)

(72) Inventors: Naoya Matsumaru, Tokyo (JP); Ken Nishioka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 304 days.

(21) Appl. No.: 18/561,891

(22) PCT Filed: May 13, 2022

(86) PCT No.: PCT/JP2022/020233
§ 371 (c)(1),
(2) Date: Nov. 17, 2023

(87) PCT Pub. No.: WO2022/244699
PCT Pub. Date: Nov. 24, 2022

(65) Prior Publication Data
US 2024/0241368 A1    Jul. 18, 2024

(30) Foreign Application Priority Data
May 18, 2021  (JP) ................................ 2021-083666

(51) Int. Cl.
*G02B 26/08*    (2006.01)
*G02B 26/10*    (2006.01)

(52) U.S. Cl.
CPC ....... *G02B 26/0858* (2013.01); *G02B 26/101* (2013.01)

(58) Field of Classification Search
CPC ........................ G02B 26/0858; G02B 26/101
See application file for complete search history.

(56) References Cited

U.S. PATENT DOCUMENTS

2008/0180633 A1    7/2008  Yamada et al.
2020/0201028 A1*   6/2020  Mochida ............ G02B 26/0858

FOREIGN PATENT DOCUMENTS

EP    2960708 A1    12/2015
JP    2007097337 A   4/2007
(Continued)

OTHER PUBLICATIONS

Japanese Office Action (and an English language translation thereof) dated Aug. 26, 2025, issued in counterpart Japanese Application No. 2024-211951.
(Continued)

*Primary Examiner* — James A Dudek
(74) *Attorney, Agent, or Firm* — Holtz, Holtz & Volek PC

(57) ABSTRACT

An optical deflector driving method includes inputting an instruction to change at least one of a first driving signal corresponding to a first driving voltage and a second driving signal corresponding to a second driving voltage, the first driving voltage and the second driving voltage being applied to an actuator swinging a mirror portion of an optical deflector around a swing axis; determining, in a case where the instruction is input, a timing when a voltage of a driving signal to be changed out of the first driving signal and the second driving signal becomes minimum; and reflecting, in a case where it is determined that the timing when the voltage of the driving signal to be changed becomes minimum comes, the change on the driving signal to be changed.

8 Claims, 22 Drawing Sheets

(56) References Cited

FOREIGN PATENT DOCUMENTS

| | | |
|---|---|---|
| JP | 2018005001 A | 1/2018 |
| JP | 2018054752 A | 4/2018 |
| JP | 2020148994 A | 9/2020 |
| JP | 2020190617 A | 11/2020 |
| WO | 2014128864 A1 | 8/2014 |

OTHER PUBLICATIONS

International Search Report (ISR) (and English language translation thereof) Jul. 26, 2022, issued in International Application No. PCT/JP2022/020233.

Written Opinion dated Jul. 26, 2022, issued in International Application No. PCT/JP2022/020233.

* cited by examiner

OPTICAL DEFLECTOR DRIVING SYSTEM AND OPTICAL DEFLECTOR DRIVING METHOD

TECHNICAL FIELD

The present invention relates to an optical deflector driving system and an optical deflector driving method, and in particular, to an optical deflector driving system and an optical deflector driving method that can prevent occurrence of abnormal oscillation in an optical deflector (thereby preventing striped pattern from appearing in picture drawn by light scanned by optical deflector) even in a case where change in offset (or amplitude) is reflected.

BACKGROUND ART

A picture projection system that effects an offset on a driving signal (driving voltage) applied to an optical deflector (actuator) to change a position (offset amount) of a picture drawn by light scanned by the optical deflector in a vertical direction is known (for example, see Patent Literature 1).

CITATION LIST

Patent Literature

Patent Literature 1: Japanese Unexamined Patent Application Publication No. 2018-54752

SUMMARY OF INVENTION

Technical Problem

However, as a result of studies, the inventors found a problem that, in the system disclosed in Patent Literature 1, in a case where change in offset (or amplitude) is reflected at a timing when an instruction to change an offset (or amplitude) is input, a waveform of the driving signal (driving voltage) is disturbed before and after the change, abnormal oscillation occurs in the optical deflector by an unnecessary frequency component (unintended frequency component) included in an edge of the driving signal (driving voltage) having the disturbed waveform, which causes a striped pattern to appear in the picture drawn by the light scanned by the optical deflector.

An object of the present invention, which has been made to solve such a problem, is to provide an optical deflector driving system and an optical deflector driving method that can prevent occurrence of abnormal oscillation in an optical deflector (thereby preventing striped pattern from appearing in picture drawn by light scanned by optical deflector) even in a case where change in offset (or amplitude) is reflected.

Solution to Problem

An optical deflector driving system according to the present invention includes a mirror portion, a first supporting portion configured to support the mirror portion, a second supporting portion configured to support the first supporting portion, and at least one actuator configured to swing the first supporting portion around a swing axis relative to the second supporting portion. The actuator includes a plurality of piezoelectric cantilevers disposed in a direction of the swing axis. The plurality of piezoelectric cantilevers are coupled in a bellows shape to cause each of the piezoelectric cantilevers to be folded back relative to an adjacent piezoelectric cantilever. A free end of the piezoelectric cantilever on the mirror portion side among the piezoelectric cantilevers is coupled to the first supporting portion. A free end of the piezoelectric cantilever on the second supporting portion side among the piezoelectric cantilevers is coupled to the second supporting portion. The optical deflector driving system applies a first driving voltage corresponding to a first driving signal, to the even-numbered piezoelectric cantilevers counted from the mirror portion to bend and deform the even-numbered piezoelectric cantilevers, and applies a second driving voltage corresponding to a second driving signal, to odd-numbered piezoelectric cantilevers counted from the mirror portion to bend and deform the odd-numbered piezoelectric cantilevers. The optical deflector driving system includes: a timing determination unit configured to, in a case where an instruction to change at least one of the first driving signal and the second driving signal is input, determine a timing when a voltage of a driving signal to be changed out of the first driving signal and the second driving signal becomes minimum; and a change reflection unit configured to, in a case where it is determined that the timing when the voltage of the driving signal to be changed becomes minimum comes, reflect the change on the driving signal to be changed.

With such a configuration, even in the case where change in offset (or amplitude) is reflected, it is possible to prevent occurrence of abnormal oscillation in the optical deflector (thereby preventing striped pattern from appearing in picture drawn by light scanned by optical deflector).

This is because change in offset (or amplitude) is not reflected at the timing when the instruction to change the offset (or amplitude) is input but is reflected on the driving signal to be changed in the case where it is determined that the timing when the voltage of the driving signal to be changed becomes minimum comes, which makes it possible to remove an unnecessary frequency component (unintended frequency component) causing abnormal oscillation of the optical deflector.

Further, in the above-described optical deflector driving system, the instruction may be an instruction to change an amplitude.

Further, in the above-described optical deflector driving system, the instruction may be an instruction to change an offset.

Further, the above-described optical deflector driving system may further include an offset division unit, the instruction may be offset level data indicating an offset amount, the offset division unit may divide the offset amount by a rising time or a falling time, and the change reflection unit may reflect the change on the driving signal to be changed in a stepwise manner every time the divided time elapses.

An optical deflector driving method according to the present invention includes: a change instruction input step of inputting an instruction to change at least one of a first driving signal corresponding to a first driving voltage and a second driving signal corresponding to a second driving voltage, the first driving voltage and the second driving voltage being applied to an actuator swinging a mirror portion of an optical deflector around a swing axis; a determination step of determining, in a case where the instruction is input, a timing when a voltage of a driving signal to be changed out of the first driving signal and the second driving signal becomes minimum; and a change reflection step of reflecting, in a case where it is determined that the timing when the voltage of the driving signal to be changed becomes minimum comes, the change on the driving signal to be changed.

With such a configuration, even in the case where change in offset (or amplitude) is reflected, it is possible to prevent occurrence of abnormal oscillation in the optical deflector (thereby preventing striped pattern from appearing in picture drawn by light scanned by optical deflector).

This is because change in offset (or amplitude) is not reflected at the timing when the instruction to change the offset (or amplitude) is input but is reflected on the driving signal to be changed in the case where it is determined that the timing when the voltage of the driving signal to be changed becomes minimum comes, which makes it possible to remove an unnecessary frequency component (unintended frequency component) causing abnormal oscillation of the optical deflector.

Further, in the above-described optical deflector driving method, the instruction may be an instruction to change an amplitude.

Further, in the above-described optical deflector driving method, the instruction may be an instruction to change an offset.

Further, the above-described optical deflector driving method may further include an offset division step, the instruction may be offset level data indicating an offset amount, in the offset division step, the offset amount may be divided by a rising time or a falling time, and in the change reflection step, the change may be reflected on the driving signal to be changed in a stepwise manner every time the divided time elapses.

Advantageous Effects of Invention

According to the present invention, it is possible to provide the optical deflector driving system and the optical deflector driving method that can prevent occurrence of abnormal oscillation in the optical deflector (thereby preventing striped pattern from appearing in picture drawn by light scanned by optical deflector) even in the case where change in offset (or amplitude) is reflected.

DESCRIPTION OF EMBODIMENTS

Figure 1:
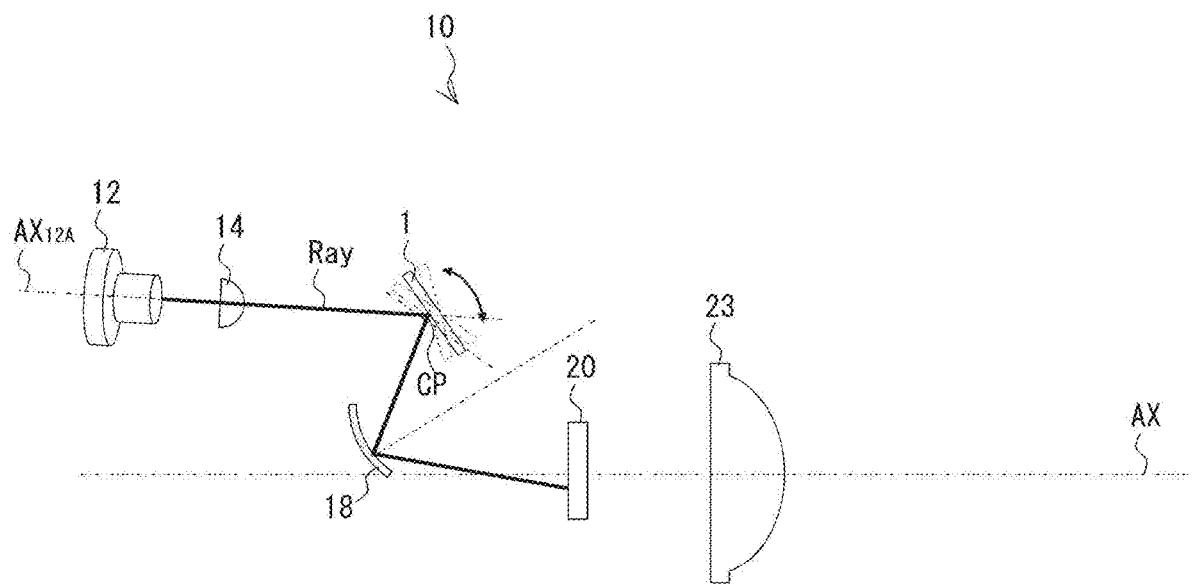
FIG. 1 is a schematic configuration diagram of an optical deflector driving system 10 according to an embodiment of the present invention.

An optical deflector driving system 10 according to an embodiment of the present invention is described below with reference to accompanying drawings. Corresponding components in the drawings are denoted by the same reference numerals, and repetitive description is omitted.

FIG. 1 is a schematic configuration diagram of the optical deflector driving system 10 according to the embodiment of the present invention.

As illustrated in FIG. 1, the optical deflector driving system 10 includes a light source 12, a condenser lens 14 condensing light (for example, laser beam) emitted from the light source 12, a correction mirror 18, an optical deflector 1 performing two-dimensional scanning (in horizontal direction and vertical direction) with a laser beam Ray that is condensed by the condenser lens 14 and is reflected by the correction mirror 18, a screen member 20 on which a picture is drawn by the laser beam Ray scanned by the optical deflector 1, a projection lens 23 projecting the picture drawn on the screen member 20, and the like. Note that the optical deflector driving system 10 has any configuration as long as the optical deflector driving system 10 includes the optical deflector drawing the picture by performing scanning with the light emitted from the light source 12.

The light source 12 is, for example, a laser diode (LD) emitting a laser beam having an emission wavelength in a blue color region. The laser beam from the light source 12 is condensed (for example, collimated) by the condenser lens 14, is reflected by the correction mirror 18, and then enters the optical deflector 1 (mirror portion 2). The correction mirror 18 is provided in order to prevent a picture drawn on the screen member 20 from being distorted. The correction mirror 18 may be omitted.

The optical deflector 1 performs the two-dimensional scanning (in horizontal direction and vertical direction) with the laser beam condensed by the condenser lens 14. A picture is drawn on the screen member 20 with the laser beam scanned by the optical deflector 1. The screen member 20 is, for example, a phosphor plate having a rectangular plate shape. The phosphor plate is a wavelength conversion member that converts at least a part of the laser beam Ray scanned by the optical deflector 1 into a light beam having a different wavelength (for example, light beam in yellow color region). The picture drawn on the screen member 20 is projected by the projection lens 23.

The optical deflector 1 is, for example, a MEMS scanner. Major systems of driving the optical deflector include a piezoelectric system, an electrostatic system, and an electromagnetic system, and any of the systems is usable. Further, the piezoelectric system is roughly divided into a uniaxial non-resonant/uniaxial resonant type, a biaxial non-resonant type, and a biaxial resonant type, and any of the types is usable.

In the following, the optical deflector 1 of the piezoelectric system (uniaxial non-resonant/uniaxial resonant type) is described as a representative.

Figure 2:
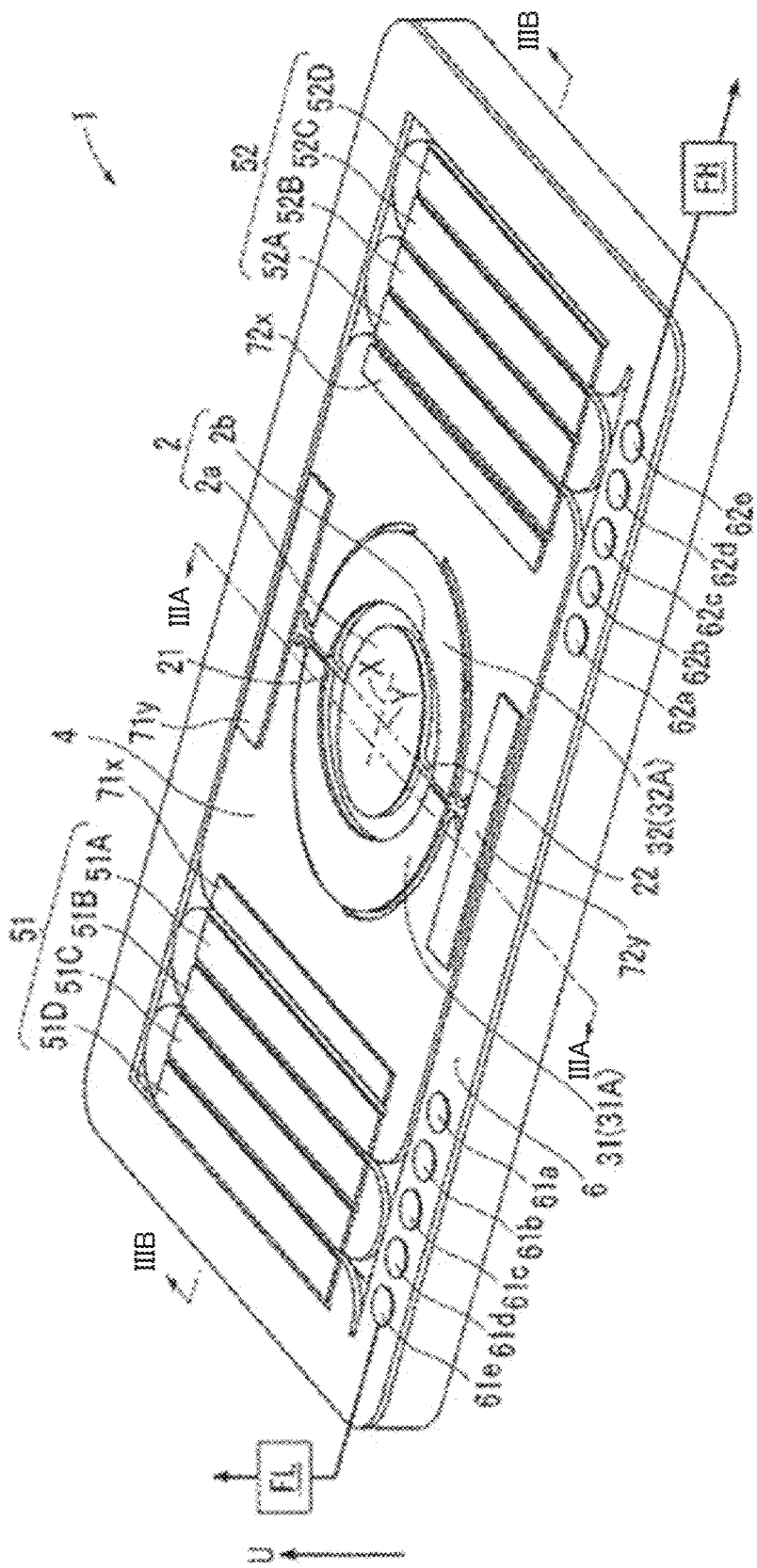
FIG. 2 is a perspective view of an optical deflector 1 of a uniaxial non-resonant/uniaxial resonant type.

FIG. 2 is a perspective view of the optical deflector 1 of the uniaxial non-resonant/uniaxial resonant type.

The optical deflector 1 includes the mirror portion 2, paired first piezoelectric actuators 31 and 32, a first supporting portion 4, paired second piezoelectric actuators 51 and 52, and a second supporting portion 6. The optical deflector 1 has any configuration as long as, in a case where change in offset (or amplitude) is reflected on a driving signal (driving voltage), unintentional abnormal oscillation (abnormal resonance) occurs in the optical deflector 1.

The mirror portion 2 includes a reflection surface 2a that has a circular shape and reflects incident light, and a reflection surface supporting body 2b that has a circular shape and supports the reflection surface 2a.

The reflection surface supporting body 2b is formed from a silicon substrate. Paired torsion bars 21 and 22 extending outward from both ends of the reflection surface supporting body 2b are coupled to the reflection surface supporting body 2b.

The first piezoelectric actuators 31 and 32 are each formed in a semi-arc shape, and are disposed at intervals so as to surround the mirror portion 2. One ends of the respective first piezoelectric actuators 31 and 32 are oppositely coupled to each other with one torsion bar 21 in between, and the other ends of the respective first piezoelectric actuators 31 and 32 are oppositely coupled to each other with the other torsion bar 22 in between.

The first supporting portion 4 is formed in a rectangular frame shape, and is provided so as to surround the mirror portion 2 and the first piezoelectric actuators 31 and 32. The first supporting portion 4 is coupled to outsides at center positions of arc portions of the first piezoelectric actuators 31 and 32, and supports the mirror portion 2 through the first piezoelectric actuators 31 and 32.

The second piezoelectric actuators 51 and 52 are oppositely disposed with the first supporting portion 4 in between. Front end parts of the second piezoelectric actuators 51 and 52 are coupled to paired sides of the first supporting portion 4 in a direction orthogonal to the torsion bars 21 and 22.

The second supporting portion 6 is formed in a rectangular frame shape, and is provided so as to surround the first supporting portion 4 and the second piezoelectric actuators 51 and 52. The other ends of the second piezoelectric actuators 51 and 52 on sides not coupled to the first supporting portion 4 are coupled to the second supporting portion 6. Accordingly, the second supporting portion 6 supports the first supporting portion 4 through the second piezoelectric actuators 51 and 52.

Next, detailed configurations of the first piezoelectric actuators 31 and 32 are described. The first piezoelectric actuators 31 and 32 respectively include first piezoelectric cantilevers 31A and 32A each configured to be bent and deformed by piezoelectric driving. More specifically, one first piezoelectric actuator 31 of the first piezoelectric actuators 31 and 32 includes one first piezoelectric cantilever 31A, and the other first piezoelectric actuator 32 of the first piezoelectric actuators 31 and 32 includes the other first piezoelectric cantilever 32A. The first piezoelectric actuators 31 and 32 can swing the mirror portion 2 around a first axis Y relative to the first supporting portion 4, through the torsion bars 21 and 22 by bending deformation of the first piezoelectric cantilevers 31A and 32A.

Next, detailed configurations of the second piezoelectric actuators 51 and 52 are described. The second piezoelectric actuators 51 and 52 include paired second piezoelectric cantilevers 51A to 51D and 52A to 52D each configured to be bent and deformed by the piezoelectric driving. More specifically, one second piezoelectric actuator 51 of the paired second piezoelectric actuators 51 and 52 includes one-side second piezoelectric cantilevers 51A to 51D that are four piezoelectric cantilevers. The other second piezoelectric actuator 52 of the paired second piezoelectric actuators 51 and 52 includes the other-side second piezoelectric cantilevers 52A to 52D that are four piezoelectric cantilevers.

Both ends of the one-side second piezoelectric cantilevers 51A to 51D are adjacent to one another such that length directions thereof are directed in the same direction. In addition, the one-side second piezoelectric cantilevers 51A to 51D are arranged side by side at predetermined intervals so as to swing the mirror portion 2 around the second axis X (axis orthogonal to first axis Y; however, second axis X is not required to be accurately orthogonal to first axis Y). The one-side second piezoelectric cantilevers 51A to 51D are coupled such that each of the one-side second piezoelectric cantilevers 51A to 51D is folded back relative to an adjacent piezoelectric cantilever. The second axis X is an example of a swing axis according to the present invention.

As with the one-side second piezoelectric cantilevers 51A to 51D, both ends of the other-side second piezoelectric cantilevers 52A to 52D are adjacent to one another such that length directions thereof are directed in the same direction. In addition, the other-side second piezoelectric cantilevers 52A to 52D are arranged side by side at predetermined intervals so as to swing the mirror portion 2 around the second axis X. The other-side second piezoelectric cantilevers 52A to 52D are coupled such that each of the other-side second piezoelectric cantilevers 52A to 52D is folded back relative to an adjacent piezoelectric cantilever.

As described above, in the one second piezoelectric actuator 51 and the other second piezoelectric actuator 52, the one-side the second piezoelectric cantilevers 51A to 51D and the other-side second piezoelectric cantilevers 52A to 52D respectively forming the one second piezoelectric actuator 51 and the other second piezoelectric actuator 52 are formed in a so-called meander shape (or bellows shape).

Among the one-side second piezoelectric cantilevers 51A to 51D and the other-side second piezoelectric cantilevers 52A to 52D, one ends (free ends) of the piezoelectric cantilevers (hereinafter, referred to as "first second piezoelectric cantilevers") 51A and 52A disposed on the mirror portion 2 side (first supporting portion 4 side) on sides not coupled to the respective adjacent second piezoelectric cantilevers (hereinafter, referred to as "second second piezoelectric cantilevers") 51B and 52B are coupled to an outer peripheral portion of the first supporting portion 4.

Likewise, among the one-side second piezoelectric cantilevers 51A to 51D and the other-side second piezoelectric cantilevers 52A to 52D, one ends (free ends) of the piezoelectric cantilevers (hereinafter, referred to as "fourth second piezoelectric cantilevers") 51D and 52D disposed on the second supporting portion 6 side on sides not coupled to the respective adjacent second piezoelectric cantilevers (hereinafter, referred to as "third second piezoelectric cantilevers") 51C and 52C are coupled to an inner peripheral portion of the second supporting portion 6.

Accordingly, the first supporting portion 4 can be swung around the second axis X relative to the second supporting portion 6 by bending deformation of the second piezoelectric cantilevers 51A to 51D and 52A to 52D that constitute the second piezoelectric actuators 51 and 52.

In the following, among the paired piezoelectric cantilevers 51A to 51D and 52A to 52D, the piezoelectric cantilevers disposed in odd numbers counted from the mirror portion 2 (first second piezoelectric cantilevers 51A and 52A, and third second piezoelectric cantilevers 51C and 52C) are referred to as odd-numbered second piezoelectric cantilevers 51A, 51C, 52A, and 52C.

Further, among the odd-numbered second piezoelectric cantilevers 51A, 51C, 52A, and 52C, the odd-numbered second piezoelectric cantilevers included in the one-side second piezoelectric cantilevers 51A to 51D are referred to as the one-side odd-numbered second piezoelectric cantilevers 51A and 51C, and the odd-numbered second piezoelectric cantilevers included in the other-side second piezoelectric cantilevers 52A to 52D are referred to as the other-side odd-numbered second piezoelectric cantilevers 52A and 52C.

Likewise, among the paired second piezoelectric cantilevers 51A to 51D and 52A to 52D, the piezoelectric cantilevers disposed in even numbers counted from the mirror portion 2 (second second piezoelectric cantilevers 51B and 52B, and fourth second piezoelectric cantilevers 51D and 52D) are referred to as even-numbered second piezoelectric cantilevers 51B, 51D, 52B, and 52D.

Further, among the even-numbered second piezoelectric cantilevers 51B, 51D, 52B, and 52D, the even-numbered second piezoelectric cantilevers included in the one-side second piezoelectric cantilevers 51A to 51D are referred to as the one-side even-numbered second piezoelectric cantilevers 51B and 51D, and the even-numbered second piezoelectric cantilevers included in the other-side second piezoelectric cantilevers 52A to 52D are referred to as the other-side even-numbered second piezoelectric cantilevers 52B and 52D.

Figure 3A:
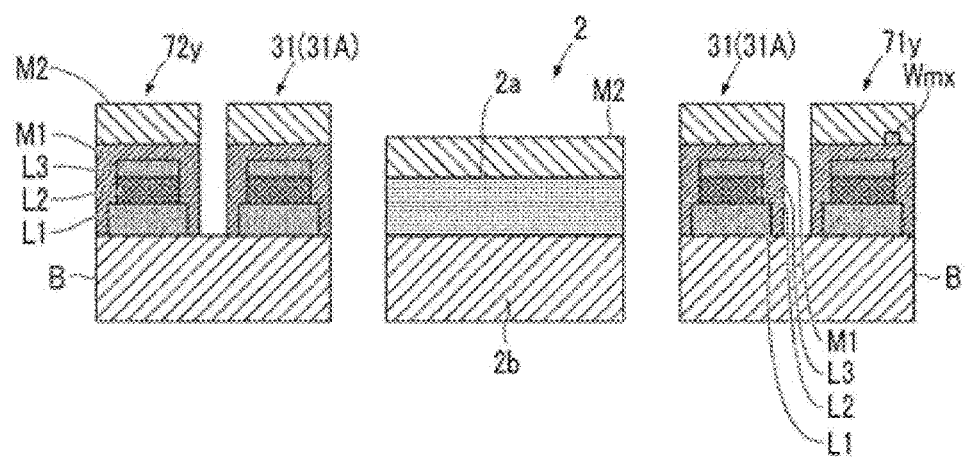
FIG. 3A is a diagram schematically illustrating an end surface taken along line IIIA-IIIA of the optical deflector in FIG. 2.
Figure 3B:
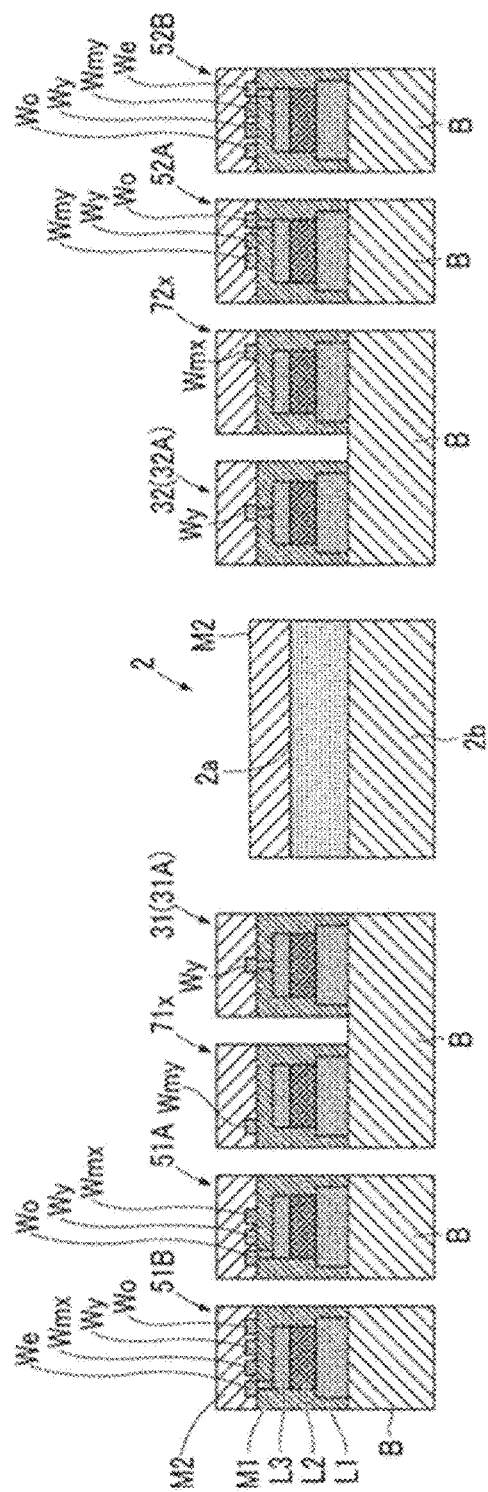
FIG. 3B is a diagram schematically illustrating an end surface taken along line IIIB-IIIB of the optical deflector in FIG. 2.

FIG. 3A and FIG. 3B are schematic end views of the optical deflector 1. FIG. 3A is an end view taken along line IIIA-IIIA in FIG. 2. In FIG. 3A, however, illustration of the second supporting portion 6 is omitted. FIG. 3B is an end view taken along line IIIA-IIIB in FIG. 2. In FIG. 3B, however, illustration of the second supporting portion 6 and the third second piezoelectric cantilevers 51C and 52C and the fourth second piezoelectric cantilevers 51D and 52 among the paired second piezoelectric cantilevers 51A to 51D and 52A to 52D is omitted.

Each of the third second piezoelectric cantilevers 51C and 52C has the configuration same as the configuration of each of the first second piezoelectric cantilevers 51A and 52A. Likewise, each of the fourth second piezoelectric cantilevers 51D and 52D has the configuration same as the configuration of each of the second second piezoelectric cantilevers 51B and 52B.

Each of the first piezoelectric cantilevers 31A and 32A that constitute the first piezoelectric actuators 31 and 32 and the paired second piezoelectric cantilevers 51A to 51D and 52A to 52D that constitute the second piezoelectric actuators 51 and 52 is a piezoelectric cantilever including a structure in which a lower electrode L1, a piezoelectric body L2, and an upper electrode L3 are stacked on a layer of a supporting body B as a strain body (cantilever main body).

As the detailed structure of each piezoelectric cantilever, the lower electrode L1, the piezoelectric body L2, and the upper electrode L3 are stacked on the layer of the supporting body B, and an interlayer insulation film M1 is provided so as to surround the lower electrode L1, the piezoelectric body L2, and the upper electrode L3. Further, upper electrode wires W are stacked on the interlayer insulation film M1, and a passivation film M2 is provided so as to surround the upper electrode wires W.

Note that, as described below, the upper electrode wires W include first driving upper electrode wires Wy, second driving odd-numbered-use upper electrode wires Wo, second driving even-numbered-use upper electrode wires We, first detection upper electrode wires Wmy, and second detection upper electrode wires Wmx, and in a case where it is unnecessary to particularly distinguish the wires from one another, the wires are referred to as the upper electrode wires W.

The piezoelectric body L2 of each of these piezoelectric cantilevers 31A, 32A, 51A to 51D, and 52A to 52D is bent and deformed by the piezoelectric driving when the driving voltage is applied between the upper electrode L3 and the lower electrode L1. Each of the piezoelectric cantilevers 31A, 32A, 51A to 51D, and 52A to 52D is bent and deformed along with bending deformation of the corresponding piezoelectric body L2.

Note that, at a coupling portion between each of the paired second piezoelectric cantilevers 51A to 51D and 52A to 52D that constitute the second piezoelectric actuators 51 and 52, and the piezoelectric cantilever adjacent thereto, the supporting bodies B of the adjacent piezoelectric cantilevers are integrally coupled, and no piezoelectric body L2 and no upper electrode L3 are provided at the coupling portion.

First detection units 71y and 72y and second detection units 71x and 72x are provided on the first supporting portion 4. The first detection units 71y and 72y are disposed, on the first supporting portion 4, at center parts of sides of the first supporting portion 4 parallel to the second axis X (sides orthogonal to sides in longitudinal direction of second piezoelectric cantilevers 51A to 51D and 52A to 52D) along the sides.

The second detection units 71x and 72x are disposed, on the first supporting portion 4, at center parts of sides of the first supporting portion 4 parallel to the first axis Y along the sides. The first detection units 71y and 72y and the second detection units 71x and 72x are provided separately from each other in a plane.

The first detection units 71y and 72y are provided as sensors detecting first oscillation transmitted to the first supporting portion 4 when the mirror portion 2 is swung around the first axis Y relative to the first supporting portion 4 by piezoelectric driving of the first piezoelectric actuators 31 and 32. The second detection units 71x and 72x are provided as sensors detecting second oscillation transmitted to the first supporting portion 4 when the first supporting portion 4 is swung around the second axis X relative to the second supporting portion 6 by piezoelectric driving of the second piezoelectric actuators 51 and 52.

As with the first piezoelectric cantilevers 31A and 32A and the second piezoelectric cantilevers 51A to 51D and 52A to 52D, each of the first detection units 71y and 72y and the second detection units 71x and 72x has the structure in which the lower electrode L1, the piezoelectric body L2, and the upper electrode L3 are stacked on the layer of the supporting body B that constitutes the first supporting portion 4. In each of the first detection units 71y and 72y and the second detection units 71x and 72x, the interlayer insulation film M1, the upper electrode wires W, and the passivation film M2 are provided as with each of the piezoelectric cantilevers 31A, 32A, 51A to 51D, and 52A to 52D.

Further, when the first supporting portion 4 is bent and deformed by transmission of the first oscillation or the second oscillation to the first supporting portion 4, the piezoelectric body L2 of each of the first detection units 71y and 72y and the second detection units 71x and 72x outputs a voltage corresponding to a deformation amount of the bending deformation. The optical deflector 1 can detect the oscillation transmitted to the first supporting portion 4 from the voltage values at this time.

It was found from a previously-performed experiment that, in the first supporting portion 4 of the optical deflector 1 according to the present embodiment, the center parts of the two sides parallel to the second axis X are easily bent and deformed when the mirror portion 2 is swung around the first axis Y. Accordingly, the first detection units 71y and 72y are disposed at the center parts of the corresponding two sides. Further, it was found from the previously-performed experiment that the center parts of the two sides parallel to the first axis Y are easily bent and deformed when the first supporting portion 4 is swung around the second axis X. Accordingly, the second detection units 71x and 72x are disposed at the center parts of the corresponding two sides.

The optical deflector 1 includes, on the second supporting portion 6, lower electrode pads 61a and 62a, first upper electrode pads 61b and 62b, odd-numbered-use second upper electrode pads 61c and 62c, even-numbered-use second upper electrode pads 61d and 62d, a first detection electrode pad 61e, and a second detection electrode pad 62e.

One lower electrode pad 61a of the lower electrode pads 61a and 62a is electrically connected to the lower electrode L1 of the one first piezoelectric cantilever 31A, the lower electrodes L1 of the one-side second piezoelectric cantilevers 51A to 51D, and the lower electrodes L1 of the first detection units 71y and 72y. The other lower electrode pad 62a of the lower electrode pads 61a and 62a is electrically connected to the lower electrode L1 of the other first piezoelectric cantilever 32A, the lower electrodes L1 of the other-side second piezoelectric cantilevers 52A to 52D, and the lower electrodes L1 of the second detection units 71x and 72x.

As described above, the lower electrode pads 61a and 62a serve as electrode pads common to the first piezoelectric actuators 31 and 32, the second piezoelectric actuators 51 and 52, the first detection units 71y and 72y, and the second detection units 71x and 72x.

One first upper electrode pad 61b of the first upper electrode pads 61b and 62b is electrically connected to the upper electrode L3 of the one first piezoelectric cantilever 31A. The other first upper electrode pad 62b of the first upper electrode pads 61b and 62b is electrically connected to the upper electrode L3 of the other first piezoelectric cantilever 32A.

One odd-numbered-use second upper electrode pad 61c of the odd-numbered-use upper electrode pads 61c and 62c is electrically connected to the upper electrodes L3 of the one-side odd-numbered second piezoelectric cantilevers 51A and 51C. The other odd-numbered-use second upper electrode pad 62c of the odd-numbered-use second upper electrode pads 61c and 62c is electrically connected to the upper electrodes L3 of the other-side odd-numbered second piezoelectric cantilevers 52A and 52C.

One even-numbered-use second upper electrode pad 61d of the even-numbered-use second upper electrode pads 61d and 62d is electrically connected to the upper electrodes L3 of the one-side even-numbered second piezoelectric cantilevers 51B and 51D. The other even-numbered-use second upper electrode pad 62d of the even-numbered-use second upper electrode pads 61d and 62d is electrically connected to the upper electrodes L3 of the other-side even-numbered second piezoelectric cantilevers 52B and 52D.

The first detection electrode pad 61e is electrically connected to the upper electrodes L3 of the first detection units 71y and 72y. The second detection electrode pad 62e is electrically connected to the upper electrodes L3 of the second detection units 71x and 72x.

With the above-described electric connection, in a case where the driving voltage is applied between the upper electrode L3 and the lower electrode L1, the piezoelectric body L2 stacked between the upper electrode L3 and the lower electrode L2 to which the driving voltage is applied is bent and deformed by the piezoelectric driving. As a result, the supporting body B (piezoelectric cantilever) corresponding to the bent and deformed piezoelectric body L2 is bent and deformed.

Further, as described below, in the first supporting portion 4, the voltages generated from the first detection units 71y and 72y by a piezoelectric effect derived from bending deformation caused by the transmitted oscillation are each output as a potential difference between the first detection electrode pad 61e and the one lower electrode pad 61a. Likewise, the voltages generated from the second detection units 71x and 72x by the piezoelectric effect derived from bending deformation of the first supporting portion 4 are each output as a potential difference between the second detection electrode pad 62e and the one lower electrode pad 61a.

The paired lower electrode pads 61a and 62a, and the lower electrodes L1 of the first piezoelectric cantilevers 31A and 32A, the second piezoelectric cantilevers 51A to 51D and 52A to 52D, the first detection units 71y and 72y, and the second detection units 71x and 72x are each formed through shape processing of metal thin films (two layers of metal thin films in present embodiment, hereinafter, also referred to as lower electrode layers) on a silicon substrate by using a semiconductor planar process. As materials of the metal thin films, for example, titanium (Ti), titanium dioxide (TiO2), or titanium oxide (TiOx) controlled in oxidation amount is used for a first layer (lower layer), and platinum (Pt), LaNiO3, or SrRuO3 is used for a second layer (upper layer).

In this case, the lower electrodes L1 of the first piezoelectric cantilevers 31A and 32A are formed over substantially entire surfaces on the supporting bodies B of the first piezoelectric cantilevers 31A and 32A. The lower electrodes L1 of the second piezoelectric cantilevers 51A to 51D and 52A to 52D are formed over substantially entire surfaces on the supporting bodies B of the second piezoelectric cantilevers 51A to 51D and 52A to 52D (entire portion including linear portion and coupling portion of each piezoelectric cantilever).

The lower electrodes L1 of the first detection units 71y and 72y are formed on portions where the first detection units 71y and 72y are disposed, on the supporting body B of the first supporting portion 4. The lower electrodes L1 of the second detection units 71x and 72x are formed on portions where the second detection units 71x and 72x are disposed, on the supporting body B of the first supporting portion 4. Likewise, the lower electrode L1, the interlayer insulation film M1, the upper electrode wires W, and the passivation film M2 are also provided on the second supporting portion 6.

The lower electrode pads 61a and 62a are conducted to the lower electrodes L1 of the first piezoelectric cantilevers 31A and 32A, the lower electrodes L1 of the second piezoelectric cantilevers 51A to 51D and 52A to 52D, the lower electrodes L1 of the first detection units 71y and 72y, and the lower electrodes L1 of the second detection units 71x and 72x through the lower electrodes L1 formed on the second supporting portion 6 and on the first supporting portion 4 in the above-described manner.

The piezoelectric bodies L2 of the first piezoelectric cantilevers 31A and 32A, the second piezoelectric cantilevers 51A to 51D and 52A to 52D, the first detection units 71y and 72y, and the second detection units 71x and 72x are formed separately from one another on the lower electrodes L1 of the respective piezoelectric cantilevers through shape processing of piezoelectric films (hereinafter, also referred to as piezoelectric body layers) on the lower electrode layers by using a semiconductor planar process. As a material of the piezoelectric films, for example, lead titanate zirconate (PZT) as a piezoelectric material is used.

In this case, the piezoelectric bodies L2 of the first piezoelectric cantilevers 31A and 32A are formed over substantially entire surfaces of the lower electrodes L1 of the first piezoelectric cantilevers 31A and 32A. The piezoelectric bodies L2 of the second piezoelectric cantilevers 51A to 51D and 52A to 52D are formed over substantially entire surfaces on the lower electrodes L1 in extending portions (linear portions) of the second piezoelectric cantilevers 51A to 51D and 52A to 52D. The piezoelectric bodies L2 of the first detection units 71y and 72y are formed over substantially entire surfaces on the lower electrodes L1 of the first detection units 71y and 72y. The piezoelectric bodies L2 of the second detection units 71x and 72x are formed over substantially entire surfaces on the lower electrodes L1 of the second detection units 71x and 72x.

"The first upper electrode pads 61b and 62b, the odd-numbered-use second upper electrode pads 61c and 62c, the even-numbered-use second upper electrode pads 61d and 62d, the first detection electrode pad 61e, and the second detection electrode pad 62e", "the upper electrodes L3 of the first piezoelectric cantilevers 31A and 32A, the second piezoelectric cantilevers 51A to 51D and 52A to 52D, the first detection units 71y and 72y, and the second detection units 71x and 72x", and the upper electrode wires W conducting these components are each formed through shape processing of a metal thin film (one layer of metal thin film in present embodiment, hereinafter, also referred to as upper electrode layer) on the piezoelectric body layer by using a semiconductor planar process. As a material of the metal thin film, for example, platinum (Pt), gold (Au), aluminum (Al), or an aluminum alloy (Al alloy) is used.

In this case, the upper electrodes L3 of the first piezoelectric cantilevers 31A and 32A, the second piezoelectric cantilevers 51A to 51D and 52A to 52D, the first detection units 71y and 72y, and the second detection units 71x and 72x are formed over substantially entire surfaces of the piezoelectric bodies L2 of the piezoelectric cantilevers and the detection units.

Further, the first upper electrode pads 61b and 62b are respectively conducted to the upper electrodes L3 of the first piezoelectric cantilevers 31A and 32A through the first driving upper electrode wires Wy in the above-described manner. Further, the odd-numbered-use second upper electrode pads 61c and 62c are conducted to the upper electrodes L3 of the odd-numbered second piezoelectric cantilevers 51A, 51C, 52A, and 52C through the second driving odd-numbered-use upper electrode wires Wo in the above-described manner. Further, the even-numbered-use second upper electrode pads 61d and 62d are conducted to the upper electrodes L3 of the even-numbered second piezoelectric cantilevers 51B, 51D, 52B, and 52D through the second driving even-numbered-use upper electrode wires We in the above-described manner.

The first detection electrode pad 61e is conducted to the upper electrodes L3 of the first detection units 71y and 72y through the first detection upper electrode wires Wmy in the above-described manner. Further, the second detection electrode pad 62e is conducted to the upper electrodes L3 of the second detection units 71x and 72x through the second detection upper electrode wires Wmx in the above-described manner.

As illustrated in FIG. 3A and FIG. 3B, the first driving upper electrode wires Wy, the second driving odd-numbered-use upper electrode wires Wo, the second driving even-numbered-use upper electrode wires We, the first detection upper electrode wires Wmy, and the second detection upper electrode wires Wmx are provided separately from one another in a plane. Each upper electrode wire W is insulated by the interlayer insulation film M1 formed between the upper electrode wire W and the upper electrode L3. To conduct the upper electrode wire W to the upper electrode L3, a conductive member (for example, electrode via) is formed in the interlayer insulation film M1 so as to conduct the upper electrode wire W and the upper electrode L3.

Each passivation film M2 is formed on the corresponding upper electrode wires W by using a semiconductor planar process so as to surround the upper electrode wires W.

The reflection surface supporting body 2b, the torsion bars 21 and 22, the supporting body B, the first supporting portion 4, and the second supporting portion 6 are integrally formed through shape processing of a semiconductor substrate (silicon substrate) including a plurality of layers. As a method of performing shape processing of the semiconductor substrate, a semiconductor planar process and a MEMS process using a photolithography technique, a dry etching technique, or the like.

Next, operation of the optical deflector 1 according to the present embodiment is described. First, a case where the first piezoelectric actuators 31 and 32 swing the mirror portion 2 around the first axis Y relative to the first supporting portion 4 is described.

In this case, the optical deflector 1 applies the driving voltages to the first piezoelectric actuators 31 and 32. More specifically, in the one first piezoelectric actuator 31, a first driving voltage Vy1 is applied between the one first upper electrode 61b and one lower electrode pad 61a to drive the one piezoelectric cantilever 31A. In the other first piezoelectric actuator 32, a second driving voltage Vy2 is applied between the other first upper electrode pad 62b and the other lower electrode pad 62a to drive the other first piezoelectric cantilever 32A. The first driving voltage Vy1 and the second driving voltage Vy2 are alternating-current voltages (for example, sine waves or sawtooth waves) opposite or shifted in phase from each other.

At this time, swing voltage components of the first driving voltage Vy1 and the second driving voltage Vy2 are applied such that, in a vertical direction (upward direction U and downward direction opposite thereto in FIG. 1) of the first piezoelectric actuators 31 and 32, angular displacement of the one first piezoelectric cantilever 31A and angular displacement the other first piezoelectric cantilever 32A are generated in opposite directions.

For example, to displace the one first piezoelectric actuator 31 in the upward direction when the mirror portion 2 is swung around the first axis Y, the one first piezoelectric cantilever 31A is displaced in the upward direction. To displace the one first piezoelectric actuator 31 in the downward direction, the one first piezoelectric cantilever 31A is displaced in the downward direction.

As with the one first piezoelectric actuator 31, to displace the other first piezoelectric actuator 32 in the upward direction, the other first piezoelectric cantilever 32A is displaced in the upward direction. To displace the other first piezoelectric actuator 32 in the downward direction, the other first piezoelectric cantilever 32A is displaced in the downward direction.

In the optical deflector 1 according to the present embodiment, when the mirror portion 2 is swung around the first axis Y, a large deflection angle is obtained by "displacing the one first piezoelectric actuator 31 in the upward direction and displacing the other first piezoelectric actuator 32 in the downward direction" or "displacing the one first piezoelectric actuator 31 in the downward direction and displacing the other first piezoelectric actuator 32 in the upward direction". As described above, in the present embodiment, the mirror portion 2 can be swung around the first axis Y, and optical scanning at a predetermined first deflection angle can be performed at a predetermined first frequency Fy.

Next, a case where the second piezoelectric actuators 51 and 52 swing the first supporting portion 4 around the second axis X relative to the second supporting portion 6 is described.

In this case, the optical deflector 1 applies the driving voltages to the second piezoelectric actuators 51 and 52. More specifically, in the one second piezoelectric actuator 51, a third driving voltage Vx1 is applied between one odd-numbered-use second upper electrode pad 61c and the one lower electrode pad 61a to drive the one-side odd-numbered second piezoelectric cantilevers 51A and 51C. In addition, in the one second piezoelectric actuator 51, a fourth driving voltage Vx2 is applied between the one even-numbered-use second upper electrode pad 61d and the one lower electrode pad 61a to drive the one-side even-numbered second piezoelectric cantilevers 51B and 51D.

Further, in the other second piezoelectric actuator 52, the third driving voltage Vx1 is applied between the other odd-numbered-use second upper electrode pad 62c and the other lower electrode pad 62a to drive the other-side odd-numbered second piezoelectric cantilevers 52A and 52C. In addition, in the other second piezoelectric actuator 52, the fourth driving voltage Vx2 is applied between the other even-numbered-use second upper electrode pad 62d and the other lower electrode pad 62a to drive the other-side even-numbered second piezoelectric cantilevers 52B and 52D.

Figure 4:
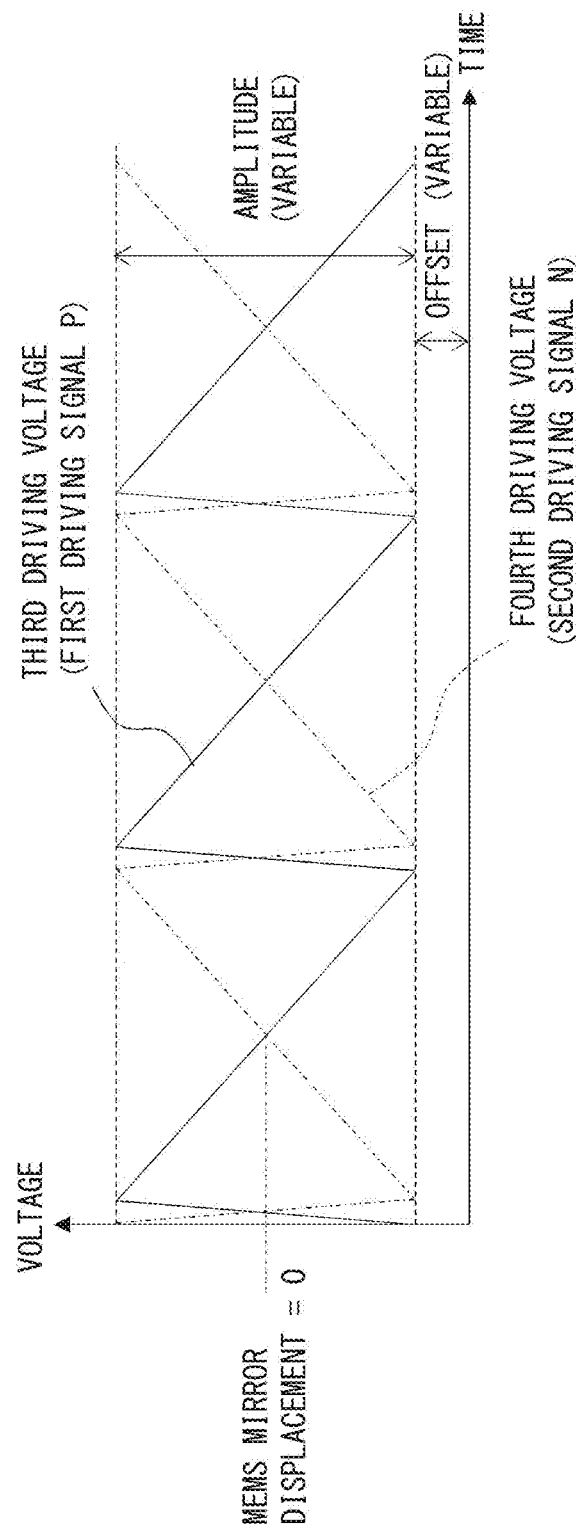
FIG. 4 illustrates examples of a third driving voltage Vx1 (driving signal P) and a fourth driving voltage Vx2 (driving signal N)

The third driving voltage Vx1 and the fourth driving voltage Vx2 are alternating-current voltages (for example, sine waves or sawtooth waves) opposite in phase to each other. FIG. 4 illustrates examples of the third driving voltage Vx1 and the fourth driving voltage Vx2. In FIG. 4, a sawtooth wave illustrated by a solid line indicates an example of the third driving voltage Vx1. In the following, the third driving voltage Vx1 is also referred to as a first driving signal P. Further, in FIG. 4, a sawtooth wave illustrated by an alternate long and short dash line indicates an example of the fourth driving voltage Vx2. In the following, the fourth driving voltage Vx2 is also referred to as a second driving signal N. Note that the third driving voltage Vx1 and the fourth driving voltage Vx2 may be alternating-current voltages (for example, sine waves or sawtooth waves) shifted in phase from each other. An angle of view and a deflection direction of the picture projected by the optical deflector driving system 10 can be changed by changing an amplitude and an offset amount of at least one of the two driving signals (first driving signal P and second driving signal N). This makes it possible to control a swing angle and an offset angle.

At this time, swing voltage components of the third driving voltage Vx1 and the fourth driving voltage Vx2 are set such that, in a vertical direction (upward direction U and downward direction opposite thereto in FIG. 1) of the second piezoelectric actuators 51 and 52, angular displacement of the odd-numbered second piezoelectric cantilevers 51A, 51C, 52A, and 52C and angular displacement of the even-numbered second piezoelectric cantilevers 51B, 51D, 52B, and 52D are generated in opposite directions.

For example, to displace front end parts of the second piezoelectric actuators 51 and 52 in the upward direction (direction U illustrated in FIG. 1) when the first supporting portion 4 is swung around the second axis X, the odd-numbered second piezoelectric cantilevers 51A, 51C, 52A, and 52C are displaced in the upward direction, and the even-numbered second piezoelectric cantilevers 51B, 51D, 52B, and 52D are displaced in the downward direction. To displace the front end parts of the second piezoelectric actuators 51 and 52 in the downward direction, the odd-numbered second piezoelectric cantilevers 51A, 51C, 52A, and 52C are displaced in the downward direction, and the even-numbered second piezoelectric cantilevers 51B, 51D, 52B, and 52D are displaced in the upward direction.

As a result, the odd-numbered second piezoelectric cantilevers 51A, 51C, 52A, and 52C and the even-numbered second piezoelectric cantilevers 51B, 51D, 52B, and 52D are bent and deformed in opposite directions.

Figure 5A:
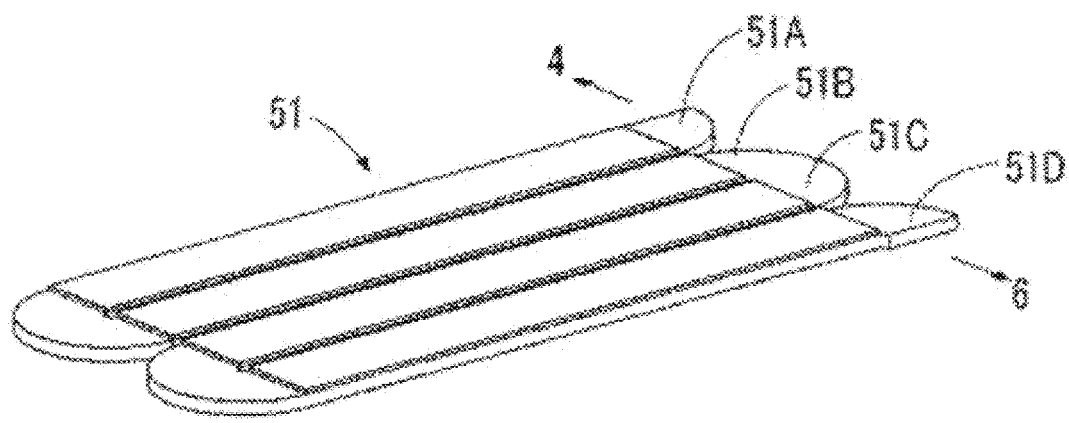
FIG. 5A is a diagram illustrating a state where a piezoelectric actuator of the optical deflector does not operate.
Figure 5B:
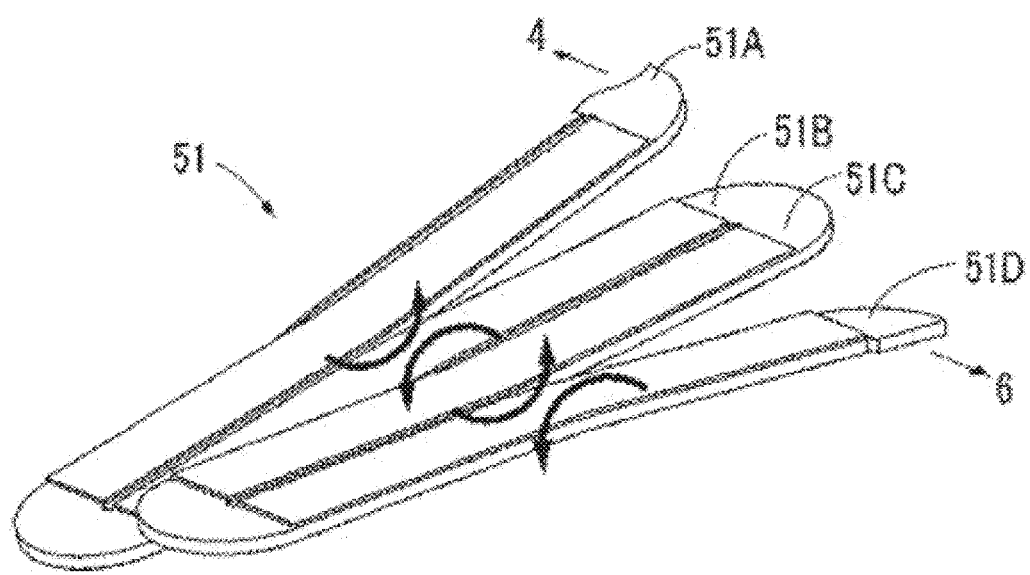
FIG. 5B is a diagram illustrating a state where the piezoelectric actuator of the optical deflector operates.

FIG. 5A and FIG. 5B are diagrams illustrating operation of the one second piezoelectric actuator 51 of the optical deflector 1. FIG. 5A illustrates a state where the one second piezoelectric actuator 51 does not operate, and FIG. 5B illustrates a state where the one second piezoelectric actuator 51 operates.

As illustrated in FIG. 5B, in a fourth one second piezoelectric cantilever 51D, angular displacement in the downward direction is generated at a front end part with a base end part coupled to the second supporting portion 6 as a fulcrum. In a third one second piezoelectric cantilever 51C, angular displacement in the upward direction is generated at a front end part with a base end part coupled to the front end part of the fourth one second piezoelectric cantilever 51D as a fulcrum.

In a second one second piezoelectric cantilever 51B, angular displacement in the downward direction is generated at a front end part with a base end part coupled to the front end part of the third one second piezoelectric cantilever 51C as a fulcrum. In the first one second piezoelectric cantilever 51A, angular displacement in the upward direction is generated at a front end part with a base end part coupled to the front end part of the second one second piezoelectric cantilever 51B as a fulcrum. As a result, in the one second piezoelectric actuator 51, angular displacement of magnitude obtained by adding magnitudes of bending deformation of the one-side second piezoelectric cantilevers 51A to 51D is generated.

As a result, the first supporting portion 4 can be swung around the second axis X, and optical scanning at a predetermined second deflection angle can be performed at a predetermined second frequency Fx. At this time, in these second piezoelectric actuators 51 and 52, the alternating-current voltages of a frequency near a mechanical resonance frequency of the first supporting portion 4 including the second piezoelectric actuators 51 and 52 are applied as the driving voltages to cause resonance driving, which makes it possible to perform the optical scanning at a larger deflection angle.

Further, in the case where the first supporting portion 4 is swung around the second axis X, it is unnecessary to apply the alternating-current voltages as described above, and direct-current voltages may be applied. In this case, the magnitude of bending deformation generated in the second piezoelectric cantilevers 51A to 51D and 52A to 52D is linearly changed based on the magnitudes of the direct-current voltages. Accordingly, for example, unlike the case where the alternating-current voltages are applied to perform resonance driving of the piezoelectric cantilevers, optional outputs can be obtained from the second piezoelectric actuators 51 and 52 by controlling the magnitudes of the direct-current voltages.

As described above, in the case where the first supporting portion 4 is swung around the second axis X, the optical deflector 1 can linearly control the deflection angle based on the magnitudes of the direct-current voltages applied as the driving voltages. This makes it possible to obtain the optional deflection angle at an optional speed.

Further, each of the second piezoelectric actuators 51 and 52 is formed in a meander shape (or in bellows shape). Accordingly, bending deformation of each piezoelectric cantilever is accumulated. Thus, the second piezoelectric actuators 51 and 52 easily obtain the large deflection angle as compared with the first piezoelectric actuators 31 and 32.

Therefore, in the present embodiment, in the case where the mirror portion 2 is swung by the first piezoelectric actuators 31 and 32, the frequency changing displacement of the first piezoelectric actuators 31 and 32 in the upward direction or the downward direction, namely, the first frequency Fy is set to a resonance frequency determined based on a structure, a material, and the like of the optical deflector 1 (in particular, piezoelectric cantilevers and the like) in order to obtain a deflection angle as large as possible.

Further, the second piezoelectric actuators 51 and 52 are each formed in a meander shape (or in bellows shape), and easily swing the first supporting portion 4 as compared with the first piezoelectric actuators 31 and 32. Accordingly, the second frequency Fx is set to be sufficiently lower than the first frequency Fy. In the present embodiment, for example, the first frequency Fy is set to 30 kHz, and the second frequency Fx is set to 60 Hz.

Figure 6:
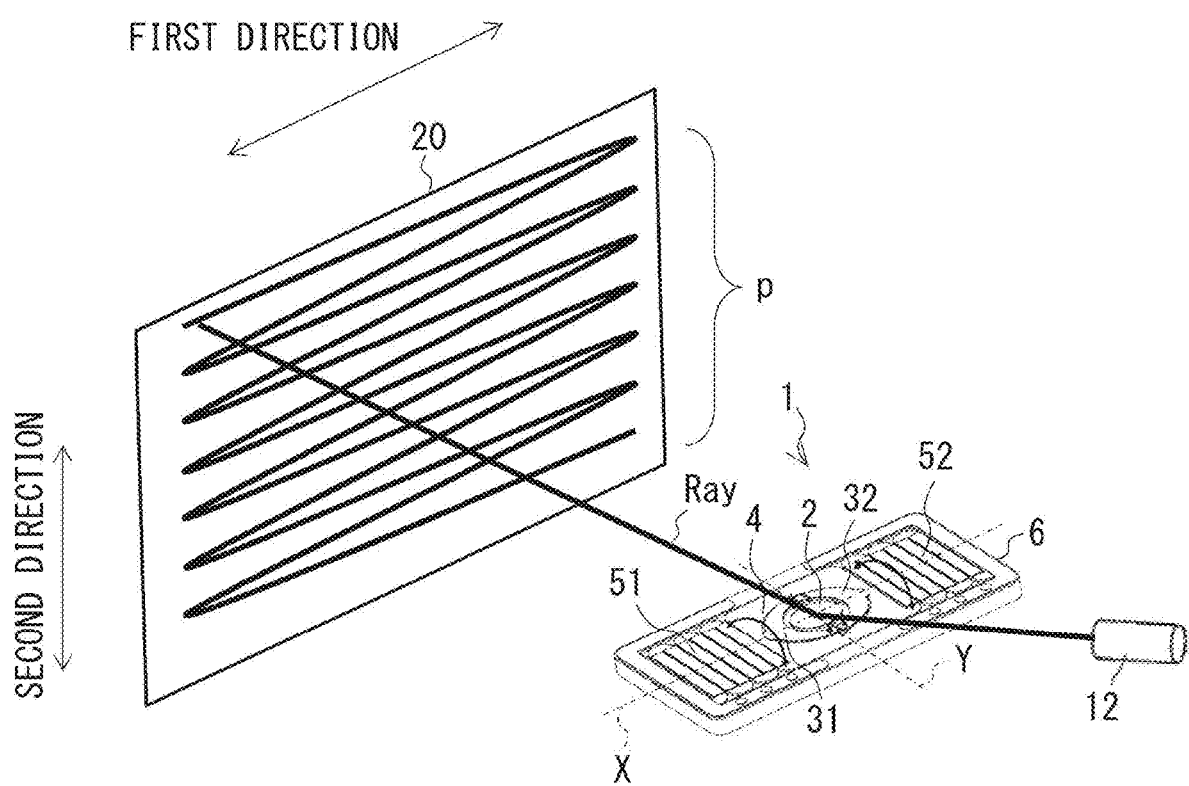
FIG. 6 is a diagram illustrating a state where a picture p is drawn on a screen member 20 with a laser beam Ray scanned (raster-scanned) by the optical deflector 1 (illustration of condenser lens 14, correction mirror 18, and projection lens 23 is omitted)

FIG. 6 is a diagram illustrating a state where the picture p is drawn on the screen member 20 with the laser beam Ray scanned (raster-scanned) by the optical deflector 1 (illustration of condenser lens 14, correction mirror 18, and projection lens 23 is omitted).

As described above, when the mirror portion 2 is swing around the first axis Y relative to the first supporting portion 4, scanning with the laser beam Ray entering the mirror portion 2 from the light source 12 is performed in a first direction (for example, horizontal direction) as illustrated in FIG. 6.

Further, when the mirror portion 2 is swung around the second axis X relative to the second supporting portion 6, scanning with the laser beam Ray entering the mirror portion 2 from the light source 12 is performed in a second direction (for example, vertical direction) as illustrated in FIG. 6.

Figure 7:
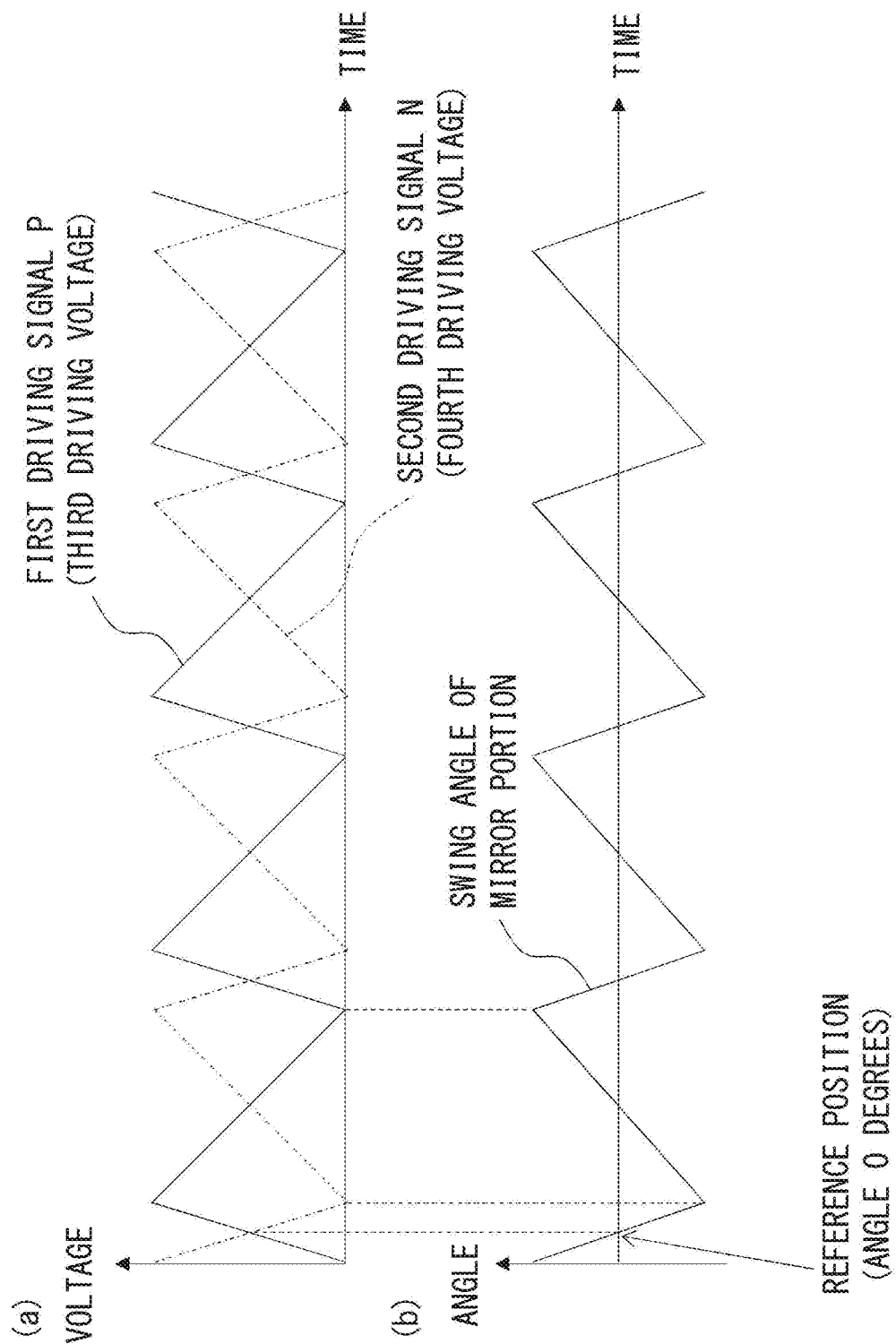
FIG. 7 is a diagram illustrating relationship between driving voltages applied to the optical deflector 1 (see FIG. 7(a)) and a swing angle of a mirror portion 2 (see FIG. 7(b))

FIG. 7 is a diagram illustrating relationship between the driving signals applied to the optical deflector 1 (see FIG. 7(a)) and the swing angle of the mirror portion 2 (see FIG. 7(b)).

In the optical deflector 1, in a case where displacement amounts of the cantilevers alternately arranged (odd-numbered second piezoelectric cantilevers 51A, 51C, 52A, and 52C and even-numbered second piezoelectric cantilevers 51B, 51D, 52B, and 52D) are equal, namely, in a case where the voltage of the first driving signal P and the voltage of the second driving signal N are equal to each other, the mirror portion 2 is located at a reference position (=angle of zero degrees, see FIG. 7(b)). The motion (swing) of the mirror portion 2 around the second axis X is the motion same as the motion of a differential signal of two signals (signal obtained by subtracting second driving signal N from first driving signal P) in terms of the driving signals. In other words, when the voltage of the differential signal is 0 V, the mirror portion 2 is located at the reference position (=angle of zero degrees, see FIG. 7(b)).

As described above, the picture p is drawn on the screen member 20 by the laser beam Ray scanned by the optical deflector 1.

Figure 8:
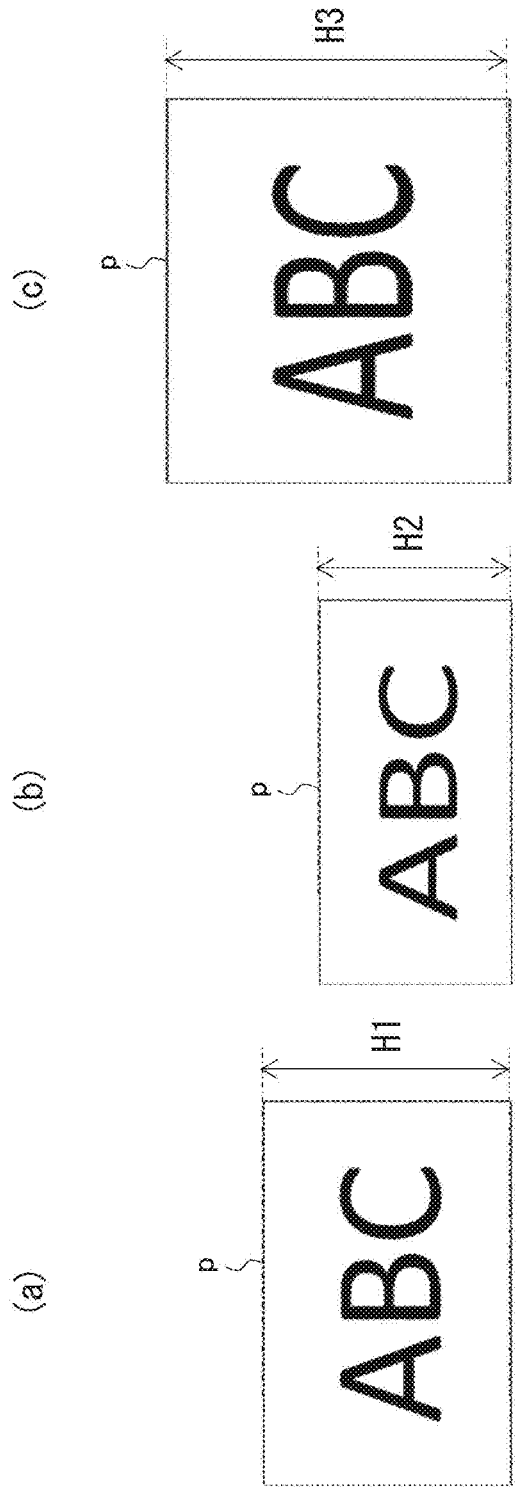
FIG. 8 illustrates examples of the picture p different in vertical width, drawn on the screen member 20.

At this time, a vertical width (see reference numerals H1 to H3 in FIG. 8) of the picture p drawn on the screen member 20 by the laser beam Ray scanned by the optical deflector 1 can be changed as illustrated in FIG. 8 by changing the amplitude of at least one of the first driving signal P and the second driving signal N (see FIG. 4). FIG. 8 illustrates examples of the picture p different in vertical width, drawn on the screen member 20.

Figure 9:
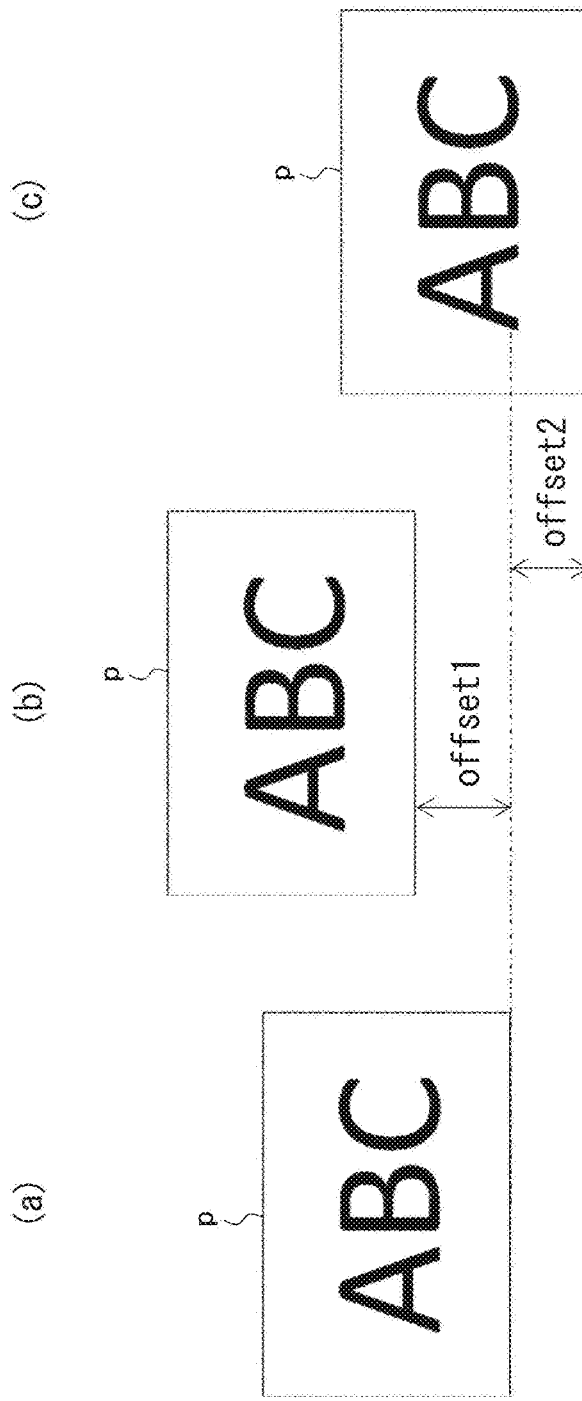
FIG. 9 illustrates examples of the picture p different in position in a vertical direction (offset amount), drawn on the screen member 20.

Further, a position (offset amount) in the vertical direction of the picture p drawn on the screen member 20 by the laser beam Ray scanned by the optical deflector 1 can be changed as illustrated in FIG. 9 by changing an offset (offset amount) of at least one of the first driving signal P and the second driving signal N (see FIG. 4). FIG. 9 illustrates examples of the picture p different in position (offset amount) in the vertical direction, drawn on the screen member 20.

Next, a functional configuration example of the optical deflector driving system 10 is described.

Figure 10:
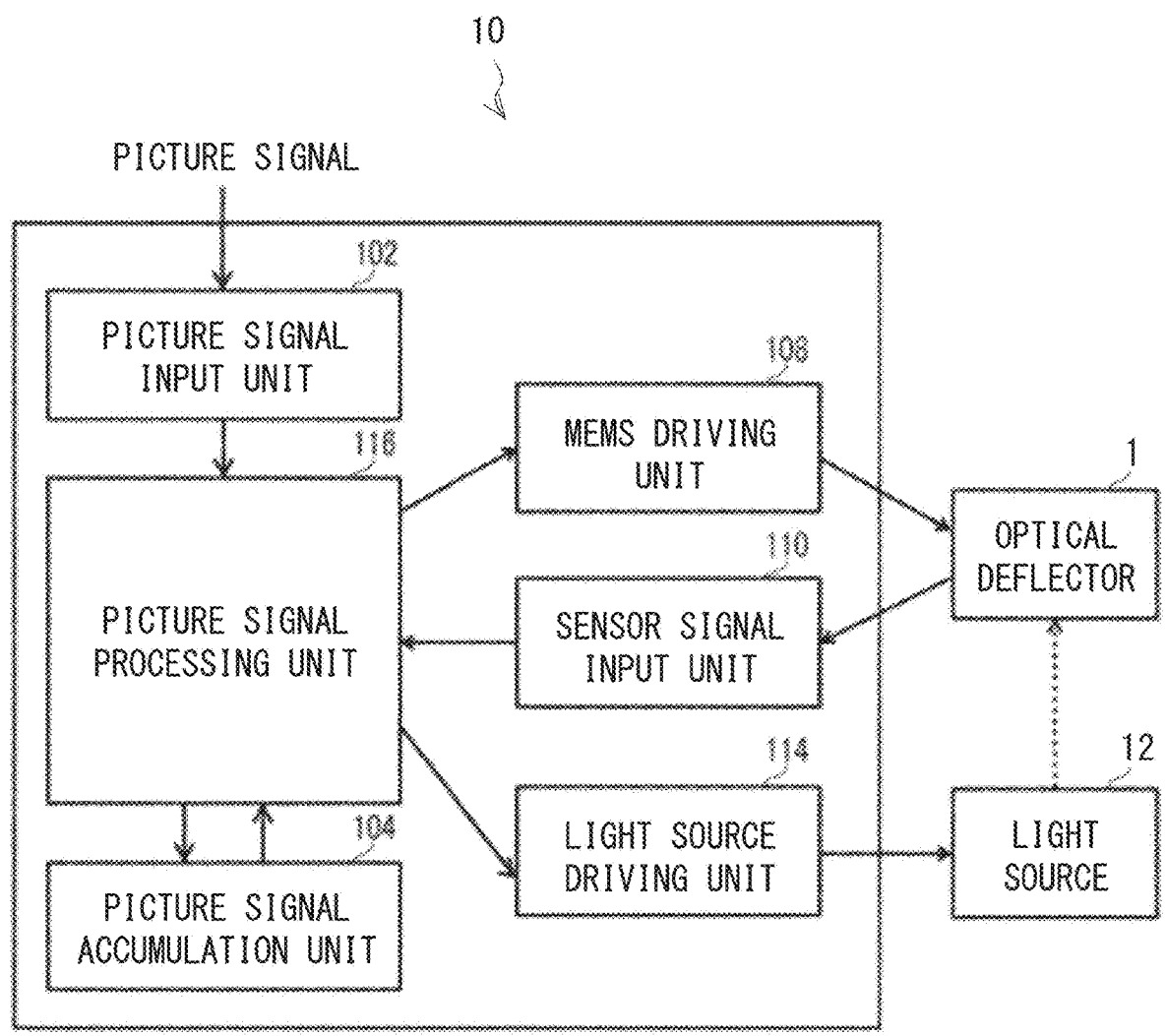
FIG. 10 illustrates a functional configuration example of the optical deflector driving system 10.

FIG. 10 illustrates the functional configuration example of the optical deflector driving system 10.

As illustrated in FIG. 10, the optical deflector driving system 10 includes a picture signal input unit 102, a picture signal processing unit 116, a picture signal accumulation unit 104, a MEMS driving unit 108, a sensor signal input unit 110, and a light source driving unit 114.

A picture signal output from an external apparatus (not illustrated) connected to the picture input unit 102 is input to the picture signal input unit 102.

The picture signal (picture) input to the picture signal input unit 102 is accumulated in the picture signal accumulation unit 104.

The picture signal processing unit 116 is, for example, a CPU (Central Processing Unit) or a DSP (Digital Signal Processor), and generates driving signals driving the optical deflector 1 (first piezoelectric actuators 31 and 32 and second piezoelectric actuators 51 and 52) and a driving signal driving the light source 12 in order to draw the picture on the screen member 20 based on the picture signal (picture) accumulated in the picture signal accumulation unit 104.

At this time, the picture signal processing unit 116 adjusts, for example, the driving signals driving the optical deflector 1 such that sensor signals (for example, voltages detected by first detection units 71y and 72y and second detection units 71x and 72x) input to the sensor signal input unit 110 are coincident with target values (feedback control).

The MEMS driving unit 108 D/A-converts (further amplifies) the driving signals driving the first piezoelectric actuators generated by the picture signal processing unit 116, and applies resultant driving signals as the first driving voltage Vy1 and the second driving voltage Vy2 to the optical deflector 1 (first piezoelectric actuators 31 and 32). Further, the MEMS driving unit 108 D/A-converts (further amplifies) the driving signals driving the second piezoelectric actuators generated by the picture signal processing unit 116, and applies resultant driving signals as the third driving voltage Vx1 (first driving signal P) and the fourth driving voltage Vx2 (second driving signal N) to the optical deflector 1 (second piezoelectric actuators 51 and 52).

The light source driving unit 114 D/A-converts (further amplifies) the driving signal driving the light source generated by the picture signal processing unit 116, and applies a resultant driving signal to the light source 12.

Next, a functional configuration example of the picture signal processing unit 116 is described.

Figure 11:
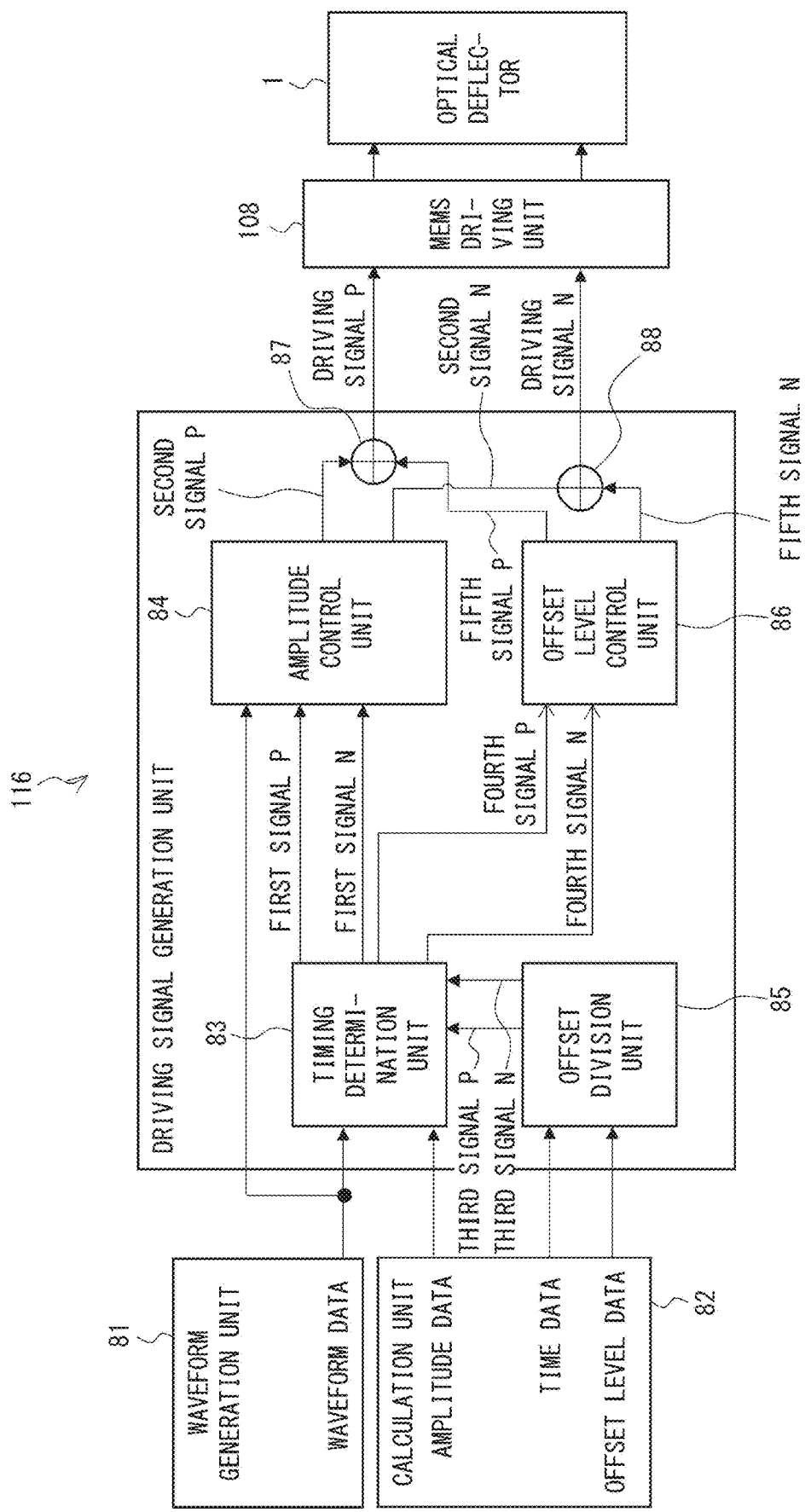
FIG. 11 illustrates a functional configuration example of a picture signal processing unit 116.

FIG. 11 illustrates the functional configuration example of the picture signal processing unit 116.

As illustrated in FIG. 11, the picture signal processing unit 116 includes a waveform generation unit 81, a calculation unit 82, a timing determination unit 83, an amplitude control unit 84, an offset division unit 85, an offset level control unit 86, a first addition unit 87, and a second addition unit 88. These units are implemented by the picture signal processing unit 116 (CPU or DSP) executing predetermined programs. Note that a part or all of the units may be implemented by hardware.

The waveform generation unit 81 outputs waveform data. FIG. 13(a), FIG. 18(h), FIG. 20(a), and FIG. 21(h) each illustrate an example of the waveform data. The waveform data is, for example, a sawtooth wave of 60 Hz. The waveform data is previously stored in a storage unit (not illustrated) such as a memory.

The calculation unit 82 outputs amplitude data, time data, and offset level data. FIG. 13(b) and FIG. 20(b) each illustrate an example of the amplitude data. The amplitude data indicates an amplitude of the driving signal.

The time data includes time data (rising time) indicating a rising time and time data (falling time) indicating a falling time. FIG. 18(b) and FIG. 21(b) each illustrate an example of the time data (rising time), and FIG. 18(c) and FIG. 21(c) each illustrate an example of the time data (falling time). More specifically, the time data (rising time) indicates time t2 in FIG. 18(h) and FIG. 21(h), and the time data (falling time) indicates time t1 in FIG. 18(h) and FIG. 21(h). FIG. 18(a) and FIG. 21(a) each illustrate an example of the offset level data. The offset level data indicates an offset amount offset.

The timing determination unit 83 determines a timing when the voltage of the driving signal to be changed becomes minimum. Further, the timing determination unit 83 outputs a first signal P (see FIG. 13(c)) and a first signal N (see FIG. 13(d)). The first signal P indicates the amplitude same as the amplitude indicated by the amplitude data. Likewise, the first signal N indicates the amplitude same as the amplitude indicated by the amplitude data. Further, the timing determination unit 83 outputs a fourth signal P (see FIG. 21(f)) and a fourth signal N (see FIG. 18(g)). The fourth signal P is a continuous pulse rising at every offset/t2. Likewise, the fourth signal N is a continuous pulse rising at every offset/t1.

The amplitude control unit 84 generates a second signal P (see FIG. 13(e)) and a second signal N (see FIG. 13(f)), and outputs the generated second signal P and the generated second signal N. The second signal P is generated by adjusting the amplitude of the waveform data (see FIG. 13(a)) to the amplitude same as the amplitude indicated by the first signal P. Likewise, the second signal N is generated by adjusting the amplitude of the waveform data obtained by inverting (by 180 degrees) a phase of the waveform data (see FIG. 13(a)) to the amplitude same as the amplitude indicated by the first signal N.

The offset division unit 85 divides the offset amount offset indicated by the offset level data output from the calculation unit 82, by the rising time t2 or the falling time t1. The offset division unit 85 outputs a third signal P (see FIG. 21(d)) and a third signal N (see FIG. 18(e)). The third signal P indicates the offset amount offset indicated by the offset level data/the rising time t2. The third signal N indicates the offset amount offset indicated by the offset level data/the falling time t1.

The offset level control unit 86 counts up a numerical value indicated by a fifth signal N output from the offset level control unit 86 by a predetermined amount (for example, one) every time a divided time (for example, offset amount offset/falling time t1) elapses (for example, in case where offset amount illustrated in FIG. 18(j) is reflected). Note that the offset level control unit 86 counts down the numerical value indicated by the fifth signal N output from the offset level control unit 86 by a predetermined amount (for example, one) every time a divided time (for example, offset amount offset/rising time t2) elapses in some cases (for example, in case where offset amount illustrated in FIG. 21(j) is reflected).

The first addition unit 87 outputs the input second signal P as is, as the first driving signal P. In a case where the fifth signal P is input to the first addition unit 87, the first addition unit 87 adds the fifth signal P (reflects change) to the second signal P, and outputs the second signal P after the addition (after reflection of change) as the first driving signal P.

The second addition unit 88 outputs the input second signal N as is, as the second driving signal N. In a case where the fifth signal N is input to the second addition unit 88, the second addition unit 88 adds the fifth signal N (reflects change) to the second signal N, and outputs the second signal N after the addition (after reflection of change) as the second driving signal N.

Next, processing by the MEMS driving unit 108 to swing the mirror portion 2 around the second axis X is described.

Figure 12:
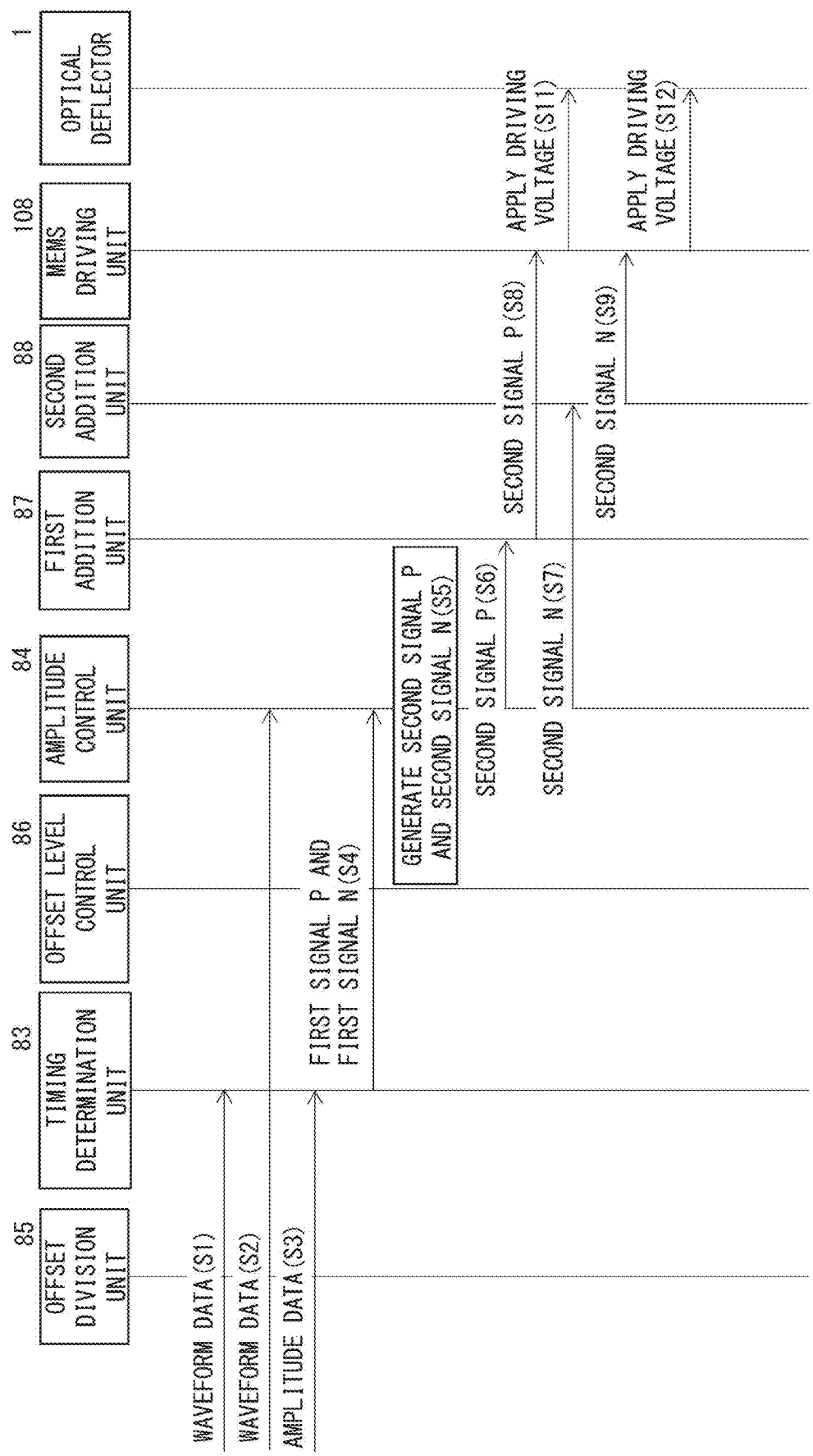
FIG. 12 is a sequence diagram of processing by a MEMS driving unit 108 to swing a mirror portion 2 around a second axis X.
Figure 13:
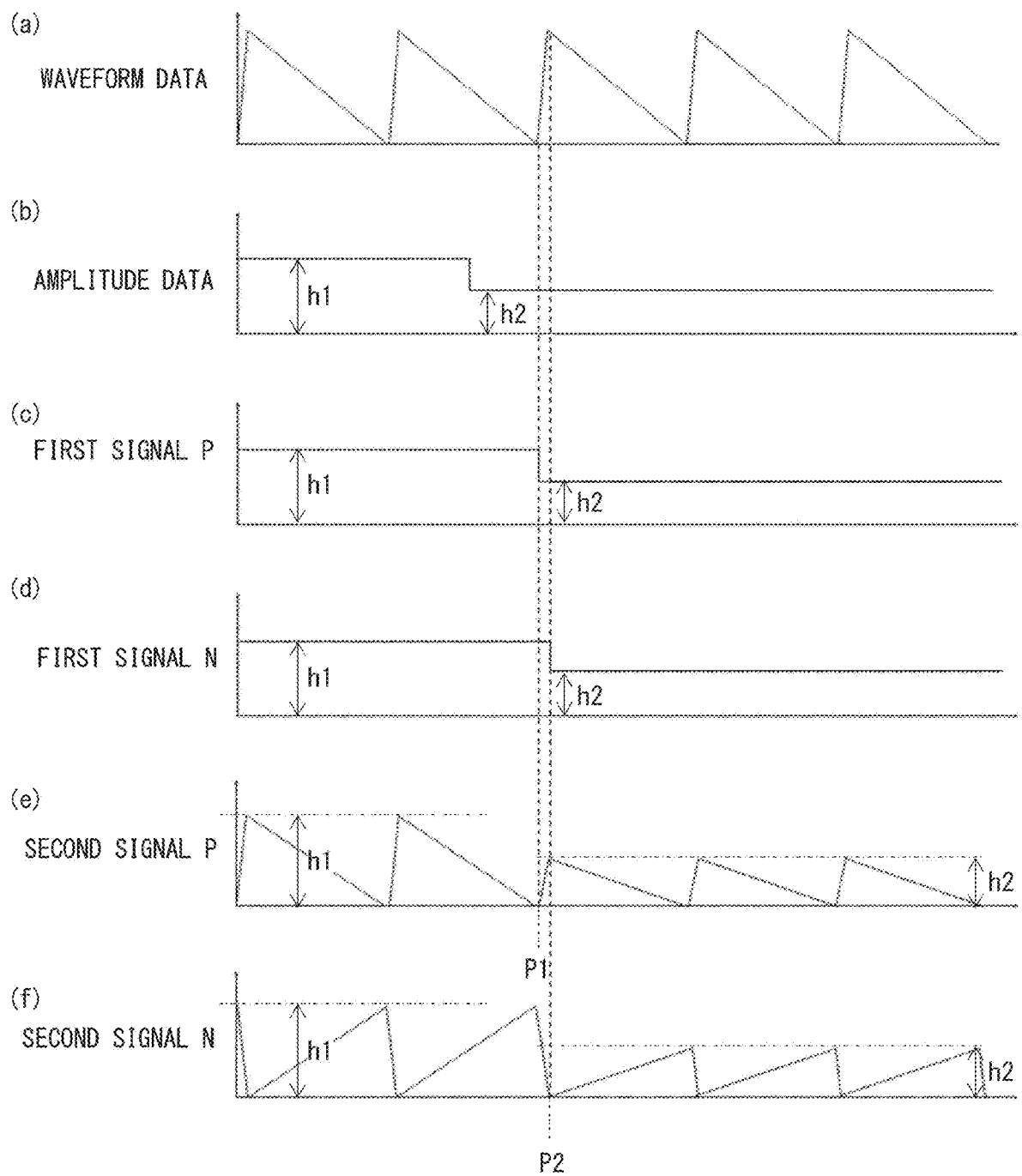
FIG. 13 illustrates signal examples (time chart) in a case where the vertical width of the picture p is reduced.

FIG. 12 is a sequence diagram of the processing by the MEMS driving unit 108 to swing the mirror portion 2 around the second axis X. FIG. 13 illustrates signal examples (time chart) in a case where the vertical width of the picture p is reduced.

First, processing by the MEMS driving unit 108 to swing the mirror portion 2 around the second axis X when the picture p having the vertical width H1 illustrated in FIG. 8(a) is drawn is described.

In the following, it is assumed that the waveform data (see FIG. 13(a)) output from the waveform generation unit 81 is input to the timing determination unit 83 and the amplitude control unit 84 as illustrated in FIG. 12 (steps S1 and S2). Further, it is assumed that the amplitude data (see FIG. 13(b)) indicating an amplitude h1 output from the calculation unit 82 is input to the timing determination unit 83 (step S3).

First, when the amplitude data indicating the amplitude h1 is input to the timing determination unit 83 (step S3), the timing determination unit 83 outputs the first signal P (see FIG. 13(c)) and the first signal N (see FIG. 13(d)) each indicating the amplitude same as the amplitude h1 indicated by the amplitude data (step S4). The first signal P and the first signal N output from the timing determination unit 83 are input to the amplitude control unit 84 (step S4).

Next, when the first signal P and the first signal N are input to the amplitude control unit 84 (step S4), the amplitude control unit 84 generates the second signal P (see FIG. 13(e)) and the second signal N (see FIG. 13(f)) (step S5), and outputs the generated second signal P and the generated second signal N (steps S6 and S7). The second signal P is generated by adjusting the amplitude of the waveform data (see FIG. 13(a)) to the amplitude same as the amplitude h1 indicated by the first signal P. Likewise, the second signal N is generated by adjusting the amplitude of the waveform data obtained by inverting (by 180 degrees) the phase of the waveform data (see FIG. 13(a)), to the amplitude same as the amplitude h1 indicated by the first signal N. The second signal P output from the amplitude control unit 84 is input to the first addition unit 87 (step S6). On the other hand, the second signal N output from the amplitude control unit 84 is input to the second addition unit 88 (step S7).

When the second signal P is input to the first addition unit 87 (step S6), the first addition unit 87 outputs the second signal P as is (step S8). The second signal P output from the first addition unit 87 is input to the MEMS driving unit 108 (step S8).

On the other hand, when the second signal N is input to the second addition unit 88 (step S7), the second addition unit 88 outputs the second signal N as is (step S9). The second signal N output from the second addition unit 88 is input to the MEMS driving unit 108 (step S9).

When the second signal P having the amplitude h1 is input to the MEMS driving unit 108 (step S8), the MEMS driving unit 108 D/A-converts (further amplifies) the second signal P having the amplitude h1, and applies a resultant signal as the third driving voltage Vx1 (first driving signal P) to the optical deflector 1 (step S11). Further, when the second signal N having the amplitude h1 is input to the MEMS driving unit (step S9), the MEMS driving unit D/A-converts (further amplifies) the second signal N having the amplitude h1, and applies a resultant signal as the fourth driving voltage Vx2 (second driving signal N) to the optical deflector 1 (step S12).

Therefore, the mirror portion 2 swings within a range corresponding to the amplitude h1 indicated by the amplitude data around the second axis X. As a result, the picture p having the vertical width H1 illustrated in FIG. 8(a) is drawn.

Next, problems found by the inventors are described.

Figure 14:
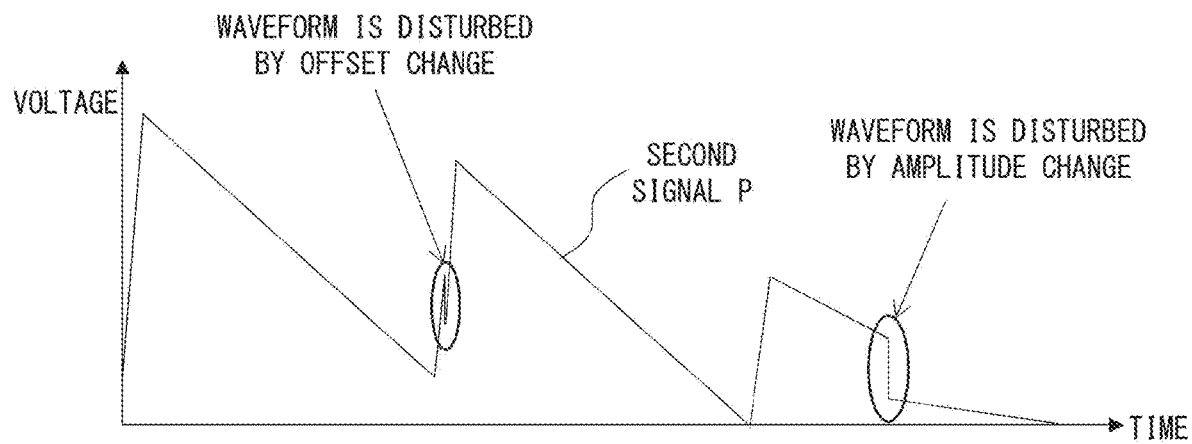
FIG. 14 is a diagram to explain problems found by the inventors.
Figure 15:
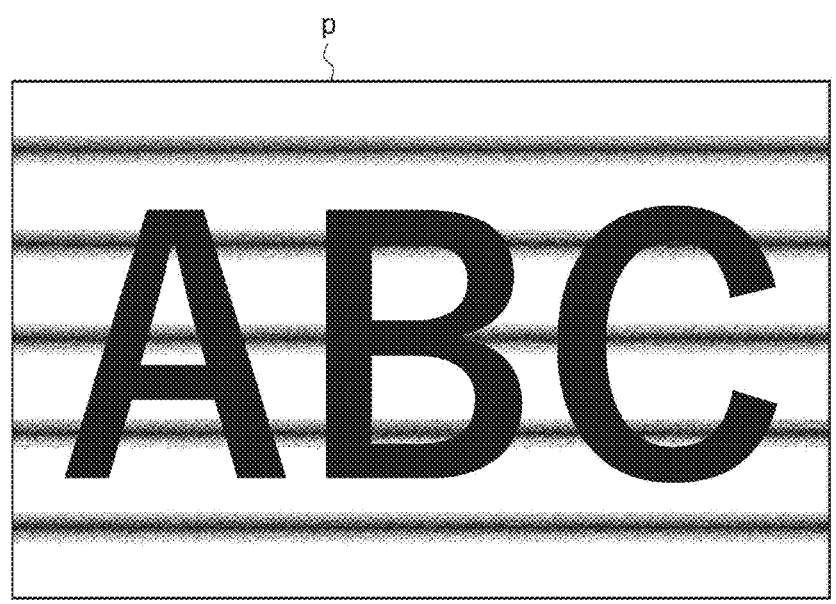
FIG. 15 is a diagram to explain the problems found by the inventors.

FIG. 14 and FIG. 15 are diagrams to explain the problems found by the inventors.

The vertical width of the picture drawn on the screen member 20 can be changed, for example, as illustrated in FIG. 8 by changing the amplitudes of the driving signals (for example, second signal P and second signal N). Further, the offset amount of the picture drawn on the screen member 20 can be changed, for example, as illustrated in FIG. 9 by adding or subtracting the fifth signal P (and fifth signal N) to/from the second signal P (and second signal N).

The optical deflector 1 includes a plurality of natural oscillation modes. In a case where a signal including a frequency component close to a natural oscillation frequency is applied to the optical deflector 1, a resonance phenomenon occurs. The resonance phenomenon generates large displacement of the optical deflector 1 (mirror portion 2) with a small application voltage. Therefore, the driving signal (driving voltage) applied to the optical deflector 1 is required to be a signal not inducing uncontrolled resonance (abnormal oscillation).

However, as a result of studies, the inventors found a problem that, in a case where change in offset (or amplitude) is reflected at a timing when an instruction to change the offset (or amplitude) is input, a waveform of the driving signal (driving voltage) is disturbed before and after the change (see FIG. 14), abnormal oscillation occurs in the optical deflector 1 by an unnecessary frequency component (unintended frequency component) included in an edge of the driving signal (driving voltage) having the disturbed waveform, which causes a striped pattern (see FIG. 15) to appear in the picture p drawn by the light scanned by the optical deflector 1.

Next, processing for changing the vertical width of the picture drawn on the screen member 20 while preventing occurrence of abnormal oscillation in the optical deflector 1 is described.

Figure 16:
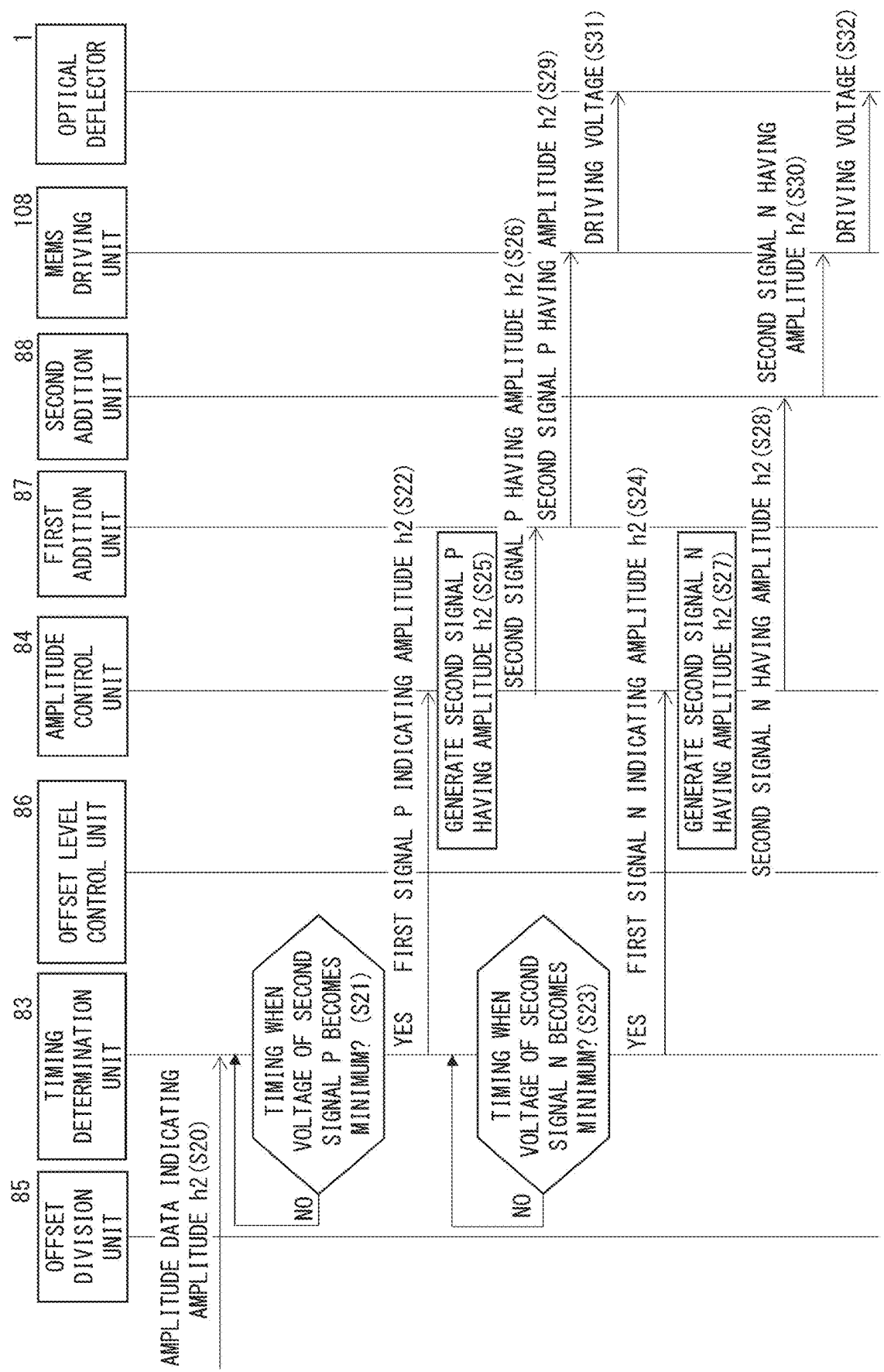
FIG. 16 is a sequence diagram of processing for changing the vertical width of the picture drawn on the screen member 20 while preventing occurrence of abnormal oscillation in the optical deflector 1.

FIG. 16 is a sequence diagram of the processing for changing the vertical width of the picture drawn on the screen member 20 while preventing occurrence of abnormal oscillation in the optical deflector 1.

In the following, as the processing for changing the vertical width of the picture drawn on the screen member 20, processing for changing (reducing) the vertical width H1 of the picture p illustrated in FIG. 8(a) to the vertical width H2 of the picture p illustrated in FIG. 8(b) is described.

In the following, it is assumed that the picture p having the vertical width H1 illustrated in FIG. 8(a) has been drawn on the screen member 20 by performing the processing in steps S1 to S12 illustrated in FIG. 12.

First, when the amplitude data (FIG. 13(b)) indicating the amplitude h2 that is different from the currently-input amplitude data indicating the amplitude h1 is input to the timing determination unit 83 (step S20), the timing determination unit 83 determines whether or not a timing when the voltage of the second signal P (see FIG. 13(e)) becomes minimum comes (step S21). The amplitude data indicating the amplitude h2 that is different from the currently-input amplitude data indicating the amplitude h1 is input by, for example, predetermined operation by a user. The amplitude data indicating the amplitude h2 that is different from the currently-input amplitude data indicating the amplitude h1 is an example of the instruction to change the amplitude according to the present invention.

The timing determination unit 83 waits until the timing when the voltage of the second signal P becomes minimum comes (see reference numeral P1 in FIG. 13(e)) (step S21:

NO). Such a timing is coincident with a timing when a voltage of the waveform data becomes minimum. Therefore, such a timing can be determined from the waveform data.

When the timing determination unit 83 determines that the timing when the voltage of the second signal P becomes minimum comes (see reference numeral P1 in FIG. 13(*e*)) (step S21: YES), the timing determination unit 83 outputs the first signal P (see FIG. 13(*c*)) indicating the amplitude same as the amplitude h2 indicated by the amplitude data (step S22). The first signal P output from the timing determination unit 83 is input to the amplitude control unit 84 (step S22).

Further, the timing determination unit 83 determines whether or not a timing when the voltage of the second signal N (see FIG. 13(*f*)) becomes minimum comes (step S23). The timing determination unit 83 waits until the timing when the voltage of the second signal N (see FIG. 13(*f*)) becomes minimum comes (see reference numeral P2 in FIG. 13(*f*)) (step S23: NO). The second signal N has a waveform opposite in phase to the waveform data. Therefore, such a timing is coincident with a timing when the voltage of the waveform data becomes maximum, and can be determined from the waveform data.

When the timing determination unit 83 determines that the timing when the voltage of the second signal N becomes minimum comes (see reference numeral P2 in FIG. 13(*f*)) (step S23: YES), the timing determination unit 83 outputs the first signal N (see FIG. 13(*d*)) indicating the amplitude same as the amplitude h2 indicated by the amplitude data (step S24). The first signal N output from the timing determination unit 83 is input to the amplitude control unit 84.

Next, when the first signal P is input to the amplitude control unit 84 (step S22), the amplitude control unit 84 generates the second signal P having the amplitude h2 (see FIG. 13(*e*)) (step S25), and outputs the generated second signal P having the amplitude h2 (step S26). The second signal P having the amplitude h2 is generated by adjusting the amplitude of the waveform data (see FIG. 13(*a*)) to the amplitude same as the amplitude h2 indicated by the first signal P. Step S25 corresponds to an example of a change reflection unit according to the present invention. The second signal P output from the amplitude control unit 84 is input to the first addition unit 87 (step S26).

Further, when the first signal N is input to the amplitude control unit 84 (step S24), the amplitude control unit 84 generates the second signal N having the amplitude h2 (see FIG. 13(*f*)) (step S27), and outputs the generated second signal N having the amplitude h2 (step S28). The second signal N having the amplitude h2 is generated by adjusting the amplitude of the waveform data obtained by inverting (by 180 degrees) the phase of the waveform data (see FIG. 13(*a*)), to the amplitude same as the amplitude h2 indicated by the first signal N. Step S27 corresponds to an example of the change reflection unit according to the present invention. The second signal N having the amplitude h2 output from the amplitude control unit 84 is input to the second addition unit 88 (step S28).

When the second signal P is input to the first addition unit 87 (step S26), the first addition unit 87 outputs the second signal P as is (step S29). The second signal P output from the first addition unit 87 is input to the MEMS driving unit 108 (step S29).

On the other hand, when the second signal N is input to the second addition unit 88 (step S28), the second addition unit 88 outputs the second signal N as is (step S30). The second signal N output from the second addition unit 88 is input to the MEMS driving unit 108 (step S30).

When the second signal P having the amplitude h2 is input to the MEMS driving unit 108 (step S29), the MEMS driving unit 108 D/A-converts (further amplifies) the second signal P having the amplitude h2, and applies a resultant signal as the third driving voltage Vx1 (first driving signal P) to the optical deflector 1 (step S31). Further, when the second signal N having the amplitude h2 is input to the MEMS driving unit (step S30), the MEMS driving unit D/A-converts (further amplifies) the second signal N having the amplitude h2, and applies a resultant signal as the fourth driving voltage Vx2 (second driving signal N) to the optical deflector 1 (step S32).

Therefore, the mirror portion 2 swings within a range corresponding to the amplitude h2 indicated by the amplitude data around the second axis X. As a result, the picture p having the vertical width H2 illustrated in FIG. 8(*b*) is drawn.

As described above, change in amplitude is not reflected at the timing when the instruction to change the amplitude is input (step S20) but is reflected on the driving signal to be changed (second signal P or second signal N) (step S25 or S27) in the case where it is determined that the timing when the voltage of the driving signal to be changed becomes minimum comes (step S21: YES, or step S23: YES). The driving is performed while maintaining a swing width before the change during a period from the timing when the instruction to change the amplitude is input until the timing when the voltage of the driving signal to be changed (second signal P or second signal N) becomes minimum.

As a result, even in the case where change in amplitude is reflected, it is possible to prevent occurrence of abnormal oscillation in the optical deflector 1 (thereby preventing striped pattern from appearing in picture drawn by light scanned by optical deflector).

Figure 20:
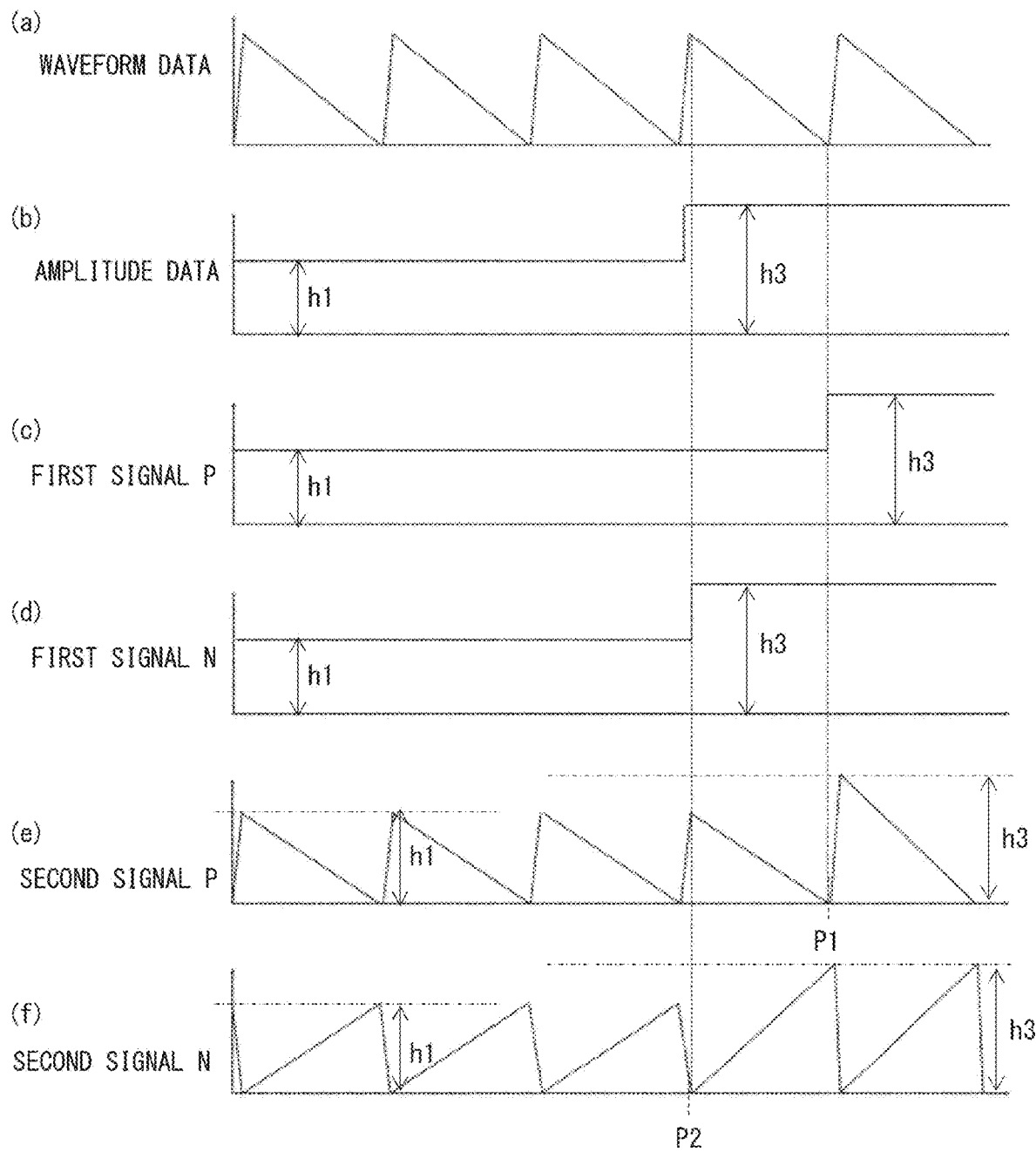
FIG. 20 illustrates signal examples (time chart) in a case where the vertical width of the picture p is increased.

The processing for changing (reducing) the vertical width H1 of the picture p illustrated in FIG. 8(*a*) to the vertical width H2 of the picture p illustrated in FIG. 8(*b*) by using the signals illustrated in FIG. 13 is described above; however, the processing is not limited thereto. For example, by using signals illustrated in FIG. 20, the vertical width H1 of the picture p illustrated in FIG. 8(*a*) can be changed (increased) to a vertical width H3 of the picture p illustrated in FIG. 8(*c*). FIG. 20 illustrate signal examples (time chart) in a case where the vertical width of the picture p is increased.

Next, processing for changing the offset amount of the picture drawn on the screen member 20 while preventing occurrence of abnormal oscillation in the optical deflector 1 is described.

Figure 17:
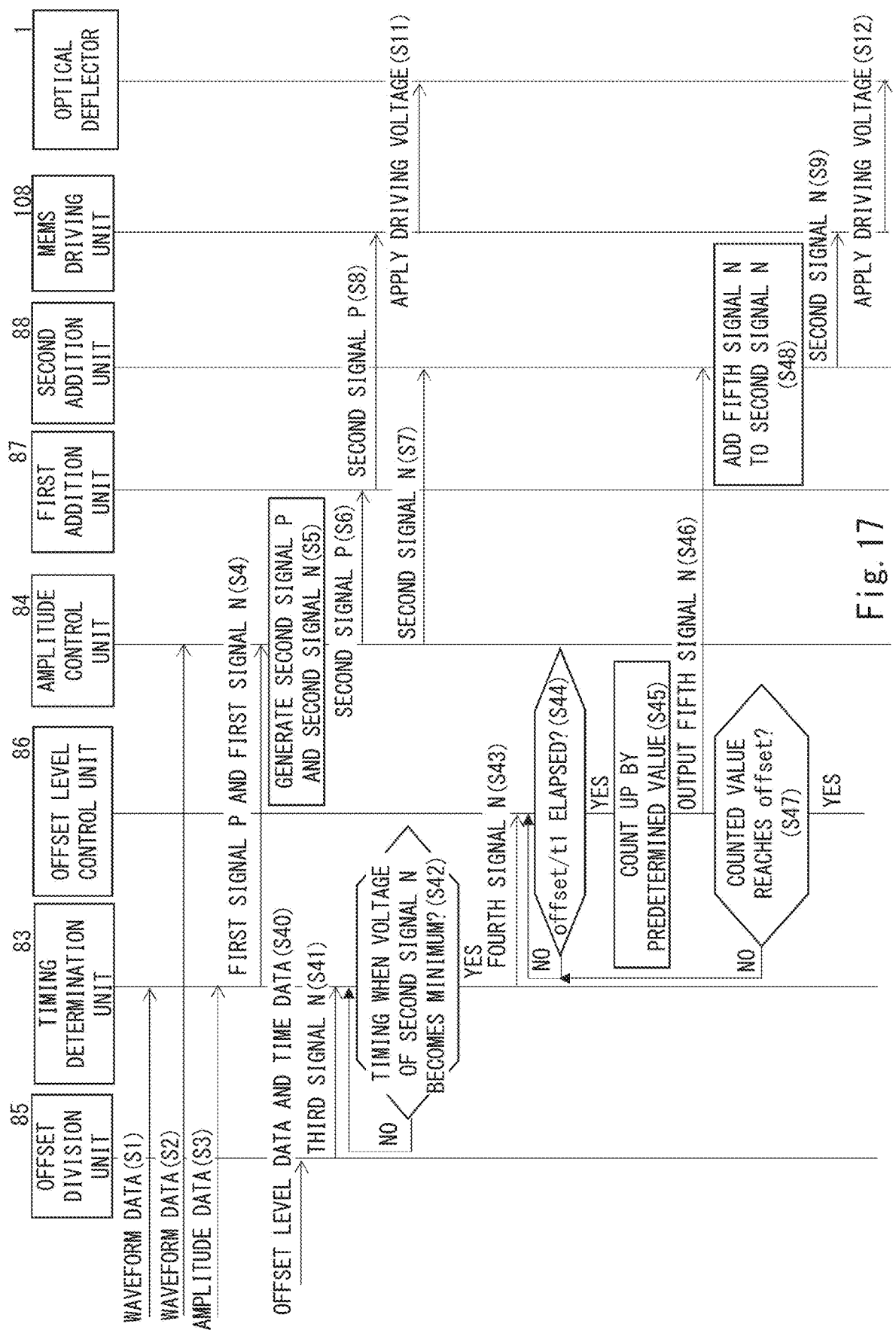
FIG. 17 is a sequence diagram of processing for changing the offset amount of the picture drawn on the screen member 20 while preventing occurrence of abnormal oscillation in the optical deflector 1.
Figure 18:
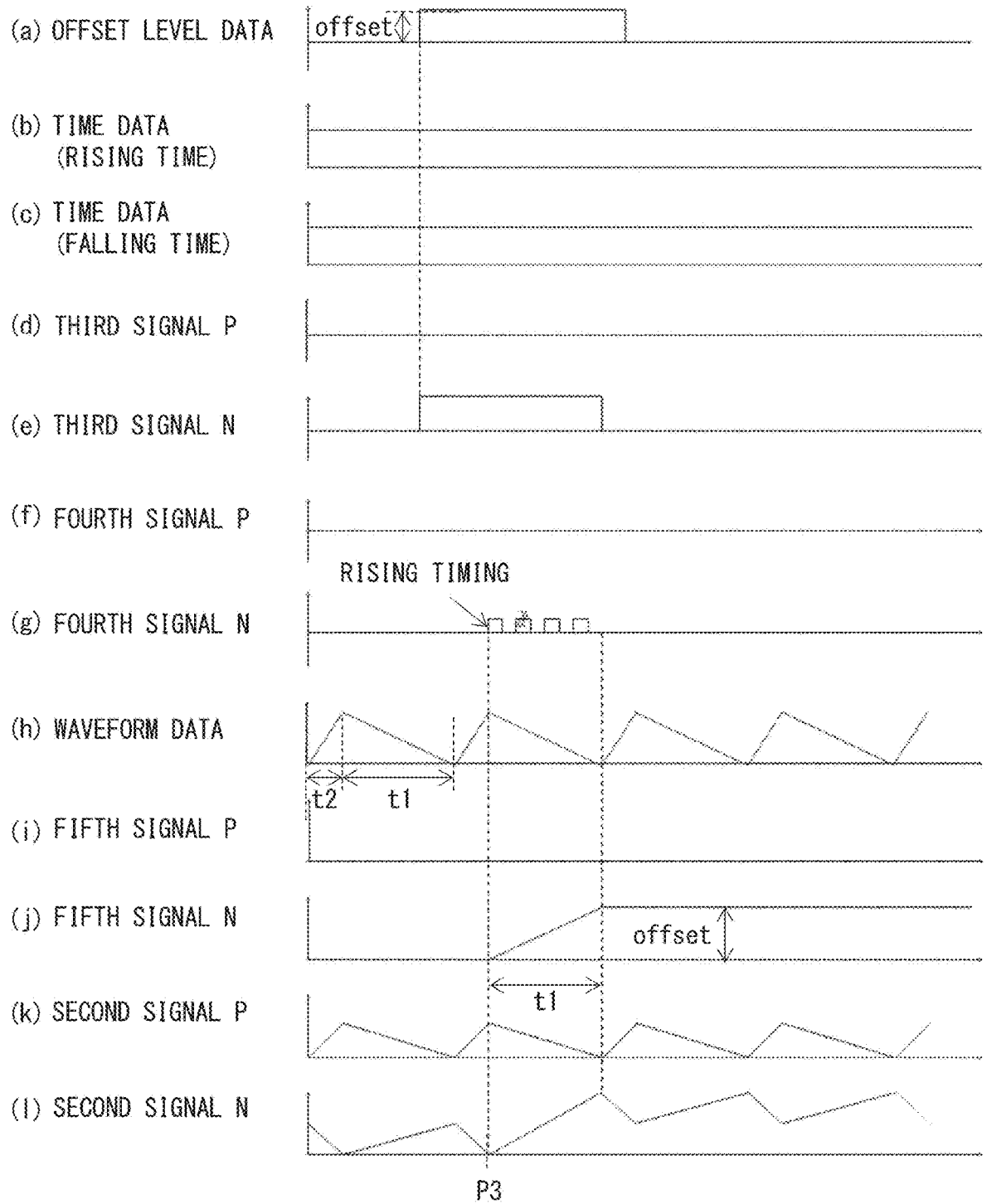
FIG. 18 illustrates signal examples (time chart) in a case where the picture p is offset upward.

FIG. 17 is a sequence diagram of the processing for changing the offset amount of the picture drawn on the screen member 20 while preventing occurrence of abnormal oscillation in the optical deflector 1. FIG. 18 illustrates signal examples (time chart) in a case where the picture p is offset upward.

In the following, as the processing for changing the offset amount of the picture drawn on the screen member 20, processing for offsetting the picture p illustrated in FIG. 9(*a*) upward as illustrated in FIG. 9(*b*) is described.

In the following, it is assumed that the picture p illustrated in FIG. 9(*a*) has been drawn on the screen member 20 by performing the processing in steps S1 to S12 illustrated in FIG. 17. Note that steps S1 to S12 illustrated in FIG. 17 are similar to steps S1 to S12 illustrated in FIG. 12.

When the offset level data (see FIG. 18(*a*)) indicating the offset amount that is different from the currently-input offset data indicating the offset amount, and the time data (see FIG. 18(*b*) and FIG. 18(*c*)) are input to the offset division unit 85 (step S40), the offset division unit 85 outputs the third signal N (see FIG. 18(*e*)) (step S41). The offset level data indicating the offset amount that is different from the currently-input offset data indicating the offset amount is input by, for example, predetermined operation by the user. The offset level data indicating the offset amount that is different from the currently-input offset data indicating the offset amount is an example of the instruction to change the offset according to the present invention. The third signal N indicates the offset amount offset indicated by the offset level data/the falling time t1. The third signal N output from the offset division unit 85 is input to the timing determination unit 83 (step S41).

When the third signal N is input to the timing determination unit 83, the timing determination unit 83 determines whether or not the timing when the voltage of the second signal N (see FIG. 18(1)) becomes minimum comes (step S42). The timing determination unit 83 waits until the timing when the voltage of the second signal N becomes minimum comes (see referent numeral P3 in FIG. 18(1)) (step S42: NO).

When the timing determination unit 83 determines that the timing when the voltage of the second signal N becomes minimum comes (see reference numeral P3 in FIG. 18(1)) (step S42: YES), the timing determination unit 83 outputs the fourth signal N (see FIG. 18(*g*)) (step S43). The fourth signal N is a continuous pulse rising at every offset amount offset/falling time t1. The fourth signal N output from the timing determination unit 83 is input to the offset level control unit 86.

The offset level control unit 86 counts up the numerical value indicated by the fifth signal N output from the offset level control unit 86 by a predetermined amount (for example, one) every time the divided time (offset amount offset/falling time t1) elapses (step S44: YES), namely, at every rising timing of the fourth signal N (see FIG. 18(*g*)) (step S45).

Figure 19:
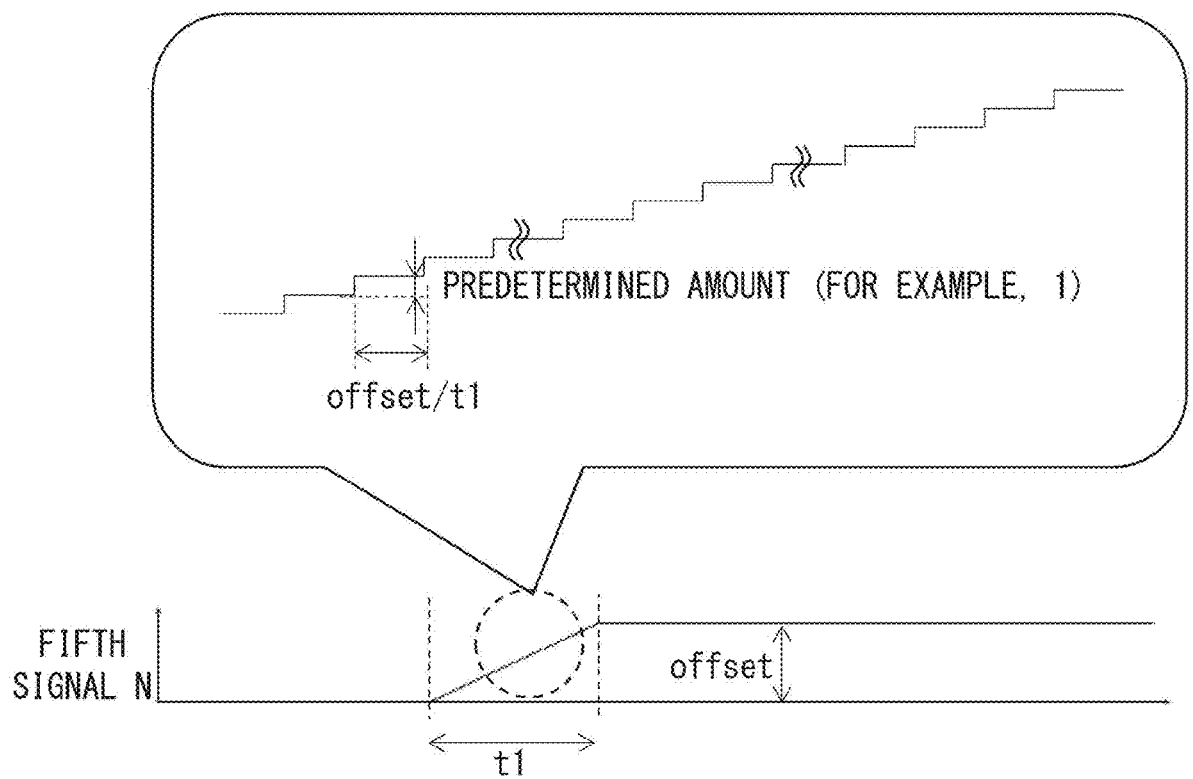
FIG. 19 is an enlarged view of a portion surrounded by a dotted-line circle of a fifth signal N.

The offset level control unit 86 repeatedly performs the processing in steps S44 to S46 (step S47: NO) until the counted numerical value reaches the offset amount offset (step S47: YES). As a result, as illustrated in FIG. 19, the fifth signal N becomes a stepwise signal counted up by the predetermined amount every time the divided time (offset amount offset/falling time t1) elapses. The fifth signal N output from the offset level control unit 86 is input to the second addition unit 88.

When the fifth signal N is input to the second addition unit 88 (step S46), the second addition unit 88 adds the fifth signal N (reflects change) to the second signal N (step S48), and outputs the second signal N after the addition (after reflection of change) as the second driving signal N (step S9). At this time, since the fifth signal N input to the second addition unit 88 is the stepwise signal counted up by the predetermined amount every time the divided time (offset amount offset/falling time t1) elapses (see FIG. 19), the change is (gradually) reflected on the driving signal to be changed (second signal N), in a stepwise manner. Step S48 corresponds to an example of the change reflection unit according to the present invention. The second signal N output from the second addition unit 88 is input to the MEMS driving unit 108 (step S9).

When the second signal N reflecting the change is input to the MEMS driving unit 108 (step S9), the MEMS driving unit 108 D/A-converts (further amplifies) the second signal N reflecting the change, and applies a resultant signal as the fourth driving voltage Vx2 (second driving signal N) to the optical deflector 1 (step S12). Further, when the second signal P is input to the MEMS driving unit 108 (step S8), the MEMS driving unit 108 D/A-converts (further amplifies) the second signal P, and applies a resultant signal as the third driving voltage Vx1 (first driving signal P) to the optical deflector 1 (step S11).

As a result, the picture p illustrated in FIG. 9(*a*) can be offset upward as illustrated in FIG. 9(*b*).

As described above, change in offset is not reflected at the timing when the instruction to change the offset is input (step S40) but is (gradually) reflected on the driving signal to be changed (for example, second signal N) in a stepwise manner (steps S43 to S47) in the case where it is determined that the timing when the voltage of the driving signal to be changed becomes minimum comes (step S42: YES).

As a result, even in the case where change in offset is reflected, it is possible to prevent occurrence of abnormal oscillation in the optical deflector 1 (thereby preventing striped pattern from appearing in picture drawn by light scanned by optical deflector).

Figure 21:
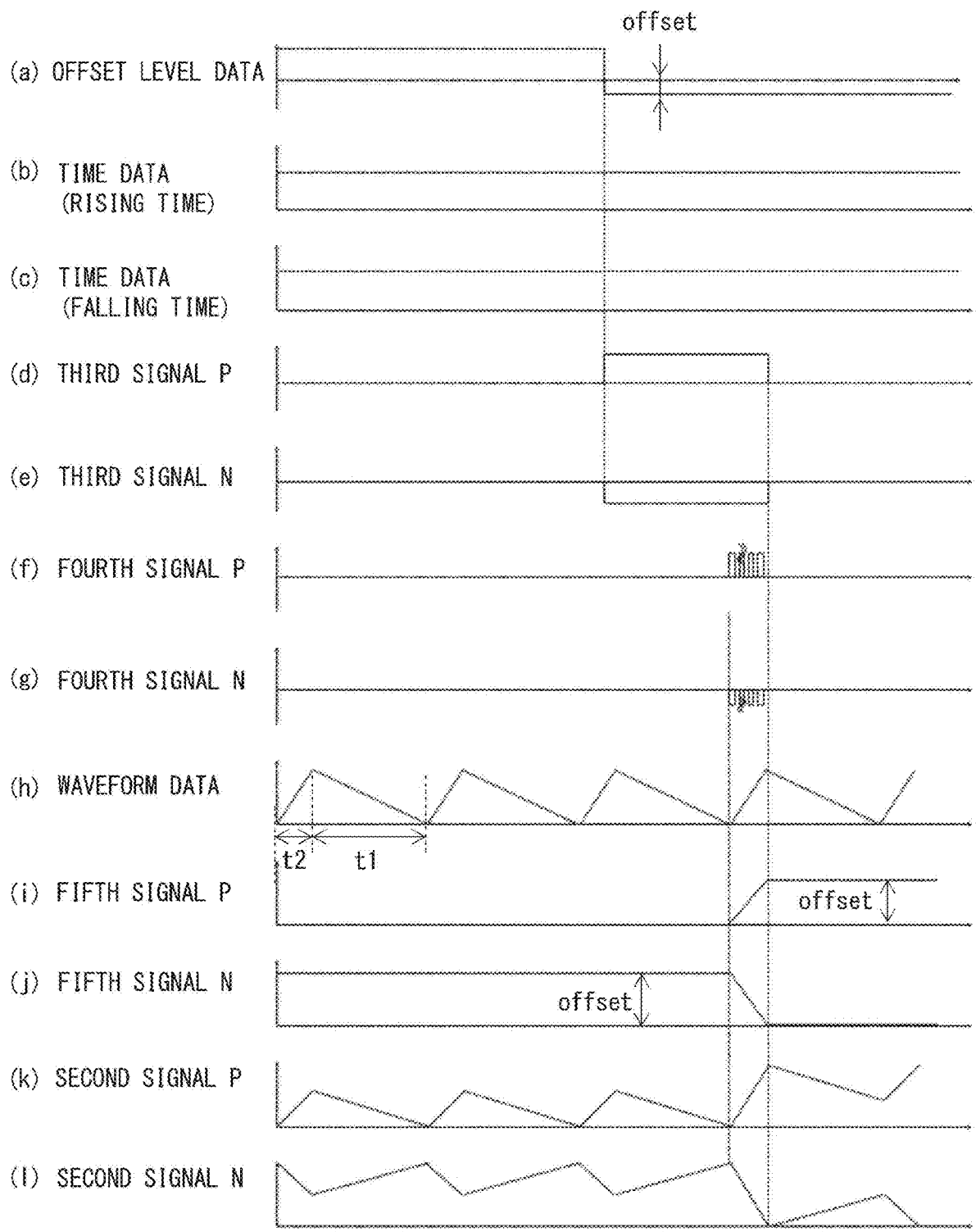
FIG. 21 illustrates signal examples (time chart) in a case where the picture p is offset downward.

The processing for offsetting the picture p illustrated in FIG. 9(*a*) upward as illustrated in FIG. 9(*b*) by using the signals illustrated in FIG. 18 is described above; however, the processing is not limited thereto. For example, by using signals illustrated in FIG. 21, the picture p illustrated in FIG. 9(*a*) can be offset downward as illustrated in FIG. 9(*c*). FIG. 21 illustrates signal examples (time chart) in a case where the picture p is offset downward.

As described above, according to the present embodiment, even in the case where change in offset (or amplitude) is reflected, it is possible to prevent occurrence of abnormal oscillation in the optical deflector 1 (thereby preventing striped pattern from appearing in picture drawn by light scanned by optical deflector).

This is because change in offset (or amplitude) is not reflected at the timing when the instruction to change the offset (or amplitude) is input but is reflected on the driving signal to be changed in the case where it is determined that the timing when the voltage of the driving signal to be changed becomes minimum comes, which makes it possible to remove an unnecessary frequency component (unintended frequency component) causing abnormal oscillation of the optical deflector 1.

Next, a modified example is described.

Figure 22:
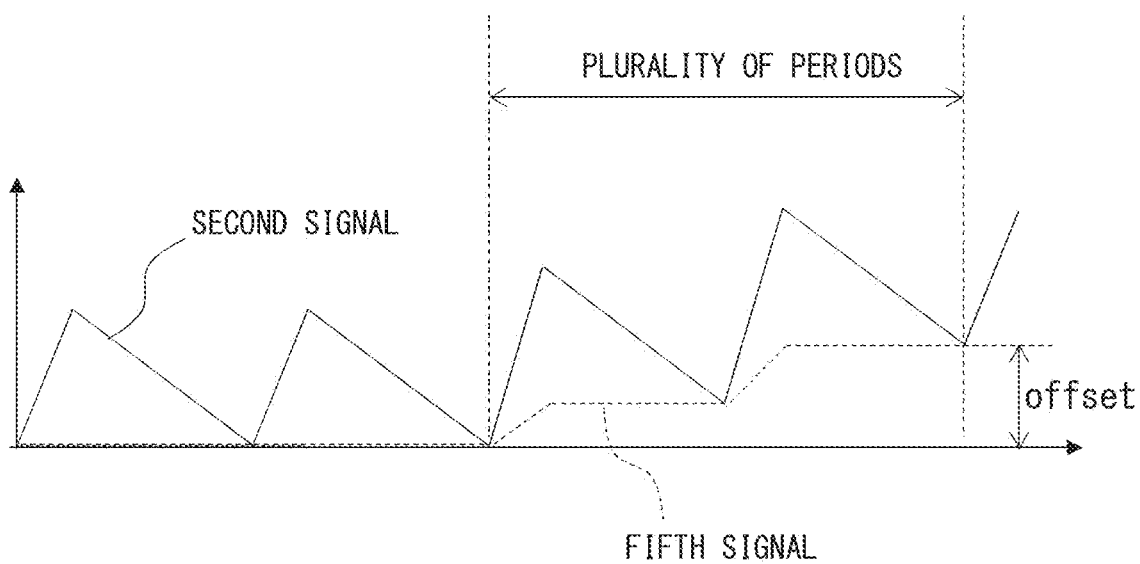
FIG. 22 is a diagram to explain a modified example of the fifth signal.

FIG. 22 is a diagram to explain a modified example of the fifth signal.

In the above-described embodiment, the example in which the processing in steps S44 to S47 (processing for reflecting change in offset) is performed during one period is described; however, the processing is not limited thereto. For example, as illustrated in FIG. 22, the processing in steps S44 to S47 (processing for reflecting change in offset) may be performed during a plurality of periods.

The numerical values described in the above-described embodiment are all illustrative, and appropriate numerical values different from the above-described numerical values can be used as a matter of course.

The above-described embodiment is merely illustrative in every respect. The present invention is not restrictively interpreted by the description of the above-described embodiment. The present invention can be implemented in other various forms without departing from the spirit or main features.

This application is based upon and claims the benefit of priority of Japanese Patent Application No. 2021-083666 filed on May 18, 2021, the entire contents of which are incorporated herein by reference.

REFERENCE SIGNS LIST

1 OPTICAL DEFLECTOR, 2 MIRROR PORTION, 2a REFLECTION SURFACE, 2b REFLECTION SURFACE SUPPORTING BODY, 4 FIRST SUPPORTING PORTION, 6 SECOND SUPPORTING PORTION, 10 OPTICAL DEFLECTOR DRIVING SYSTEM, 12 LIGHT SOURCE, 14 CONDENSER LENS, 18 CORRECTION MIRROR, 20 SCREEN MEMBER, 21, 22 TORSION BAR, 23 PROJECTION LENS, 31 FIRST PIEZOELECTRIC ACTUATOR, 31A FIRST PIEZOELECTRIC CANTILEVER, 32 FIRST PIEZOELECTRIC ACTUATOR, 32A FIRST PIEZOELECTRIC CANTILEVER, 51 SECOND PIEZOELECTRIC ACTUATOR, 51A SECOND PIEZOELECTRIC CANTILEVER, 51B SECOND PIEZOELECTRIC CANTILEVER, 51C SECOND PIEZOELECTRIC CANTILEVER, 51D SECOND PIEZOELECTRIC CANTILEVER, 52 SECOND PIEZOELECTRIC ACTUATOR, 52A SECOND PIEZOELECTRIC CANTILEVER, 52B SECOND PIEZOELECTRIC CANTILEVER, 52C SECOND PIEZOELECTRIC CANTILEVER, 52D SECOND PIEZOELECTRIC CANTILEVER, 61a LOWER ELECTRODE PAD, 61b FIRST UPPER ELECTRODE PAD, 61c ODD-NUMBERED-USE SECOND UPPER ELECTRODE PAD, 61d EVEN-NUMBERED-USE SECOND UPPER ELECTRODE PAD, 61e FIRST DETECTION ELECTRODE PAD, 62a LOWER ELECTRODE PAD, 62b FIRST UPPER ELECTRODE PAD, 62c ODD-NUMBERED-USE SECOND UPPER ELECTRODE PAD, 62d EVEN-NUMBERED-USE SECOND UPPER ELECTRODE PAD, 62e SECOND DETECTION ELECTRODE PAD, 71x SECOND DETECTION UNIT, 71y FIRST DETECTION UNIT, 72x SECOND DETECTION UNIT, 72y FIRST DETECTION UNIT, 81 WAVEFORM GENERATION UNIT, 82 CALCULATION UNIT, 83 TIMING DETERMINATION UNIT, 84 AMPLITUDE CONTROL UNIT, 85 OFFSET DIVISION UNIT, 86 OFFSET LEVEL CONTROL UNIT, 87 FIRST ADDITION UNIT, 88 SECOND ADDITION UNIT, 102 PICTURE SIGNAL INPUT UNIT, 104 PICTURE SIGNAL ACCUMULATION UNIT, 108 MEMS DRIVING UNIT, 110 SENSOR SIGNAL INPUT UNIT, 114 LIGHT SOURCE DRIVING UNIT, 116 PICTURE SIGNAL PROCESSING UNIT, B SUPPORTING BODY, Fx SECOND FREQUENCY, Fy FIRST FREQUENCY, H1 TO H3 VERTICAL WIDTH, L1 LOWER ELECTRODE, L2 PIEZOELECTRIC BODY, L3 UPPER ELECTRODE, M1 INTERLAYER INSULATION FILM, M2 PASSIVATION FILM

The invention claimed is:

1. An optical deflector driving system including a mirror portion, a first supporting portion configured to support the mirror portion, a second supporting portion configured to support the first supporting portion, and at least one actuator configured to swing the first supporting portion around a swing axis relative to the second supporting portion, the actuator including a plurality of piezoelectric cantilevers disposed in a direction of the swing axis, the plurality of piezoelectric cantilevers being coupled in a bellows shape to cause each of the piezoelectric cantilevers to be folded back relative to an adjacent piezoelectric cantilever, a free end of the piezoelectric cantilever on the mirror portion side among the piezoelectric cantilevers being coupled to the first supporting portion, a free end of the piezoelectric cantilever on the second supporting portion side among the piezoelectric cantilevers being coupled to the second supporting portion, the optical deflector driving system applying a first driving voltage corresponding to a first driving signal, to the even-numbered piezoelectric cantilevers counted from the mirror portion to bend and deform the even-numbered piezoelectric cantilevers, and applying a second driving voltage corresponding to a second driving signal, to odd-numbered piezoelectric cantilevers counted from the mirror portion to bend and deform the odd-numbered piezoelectric cantilevers, the optical deflector driving system comprising:

a timing determination unit configured to, in a case where an instruction to change at least one of the first driving signal and the second driving signal is input, determine a timing when a voltage of a driving signal to be changed out of the first driving signal and the second driving signal becomes minimum; and a change reflection unit configured to, in a case where it is determined that the timing when the voltage of the driving signal to be changed becomes minimum comes, reflect the change on the driving signal to be changed.

2. The optical deflector driving system according to claim 1, wherein the instruction is an instruction to change an amplitude.

3. The optical deflector driving system according to claim 1, wherein the instruction is an instruction to change an offset.

4. The optical deflector driving system according to claim 1, further comprising an offset division unit, wherein the instruction is offset level data indicating an offset amount, the offset division unit divides the offset amount by a rising time or a falling time, and the change reflection unit reflects the change on the driving signal to be changed in a stepwise manner every time the divided time elapses.

5. An optical deflector driving method, comprising:

a change instruction input step of inputting an instruction to change at least one of a first driving signal corresponding to a first driving voltage and a second driving signal corresponding to a second driving voltage, the first driving voltage and the second driving voltage being applied to an actuator swinging a mirror portion of an optical deflector around a swing axis;

a determination step of determining, in a case where the instruction is input, a timing when a voltage of a driving signal to be changed out of the first driving signal and the second driving signal becomes minimum; and a change reflection step of reflecting, in a case where it is determined that the timing when the voltage of the driving signal to be changed becomes minimum comes, the change on the driving signal to be changed.

6. The optical deflector driving method according to claim 5, wherein the instruction is an instruction to change an amplitude.

7. The optical deflector driving method according to claim 5, wherein the instruction is an instruction to change an offset.

8. The optical deflector driving method according to claim 5, further comprising an offset division step, wherein the instruction is offset level data indicating an offset amount, in the offset division step, the offset amount is divided by a rising time or a falling time, and in the change reflection step, the change is reflected on the driving signal to be changed in a stepwise manner every time the divided time elapses.

* * * * *